United States Patent [19]
Weinreich

[11] Patent Number: 5,535,421
[45] Date of Patent: Jul. 9, 1996

[54] CHORD KEYBOARD SYSTEM USING ONE CHORD TO SELECT A GROUP FROM AMONG SEVERAL GROUPS AND ANOTHER CHORD TO SELECT A CHARACTER FROM THE SELECTED GROUP

[76] Inventor: Michael Weinreich, 39 Oneida Rd., Acton, Mass. 01720

[21] Appl. No.: 33,098

[22] Filed: Mar. 16, 1993

[51] Int. Cl.⁶ .................................................. G06F 3/023
[52] U.S. Cl. ..................... 395/887; 395/700; 364/234; 364/234.2; 364/234.4; 364/236; 364/709.16
[58] Field of Search ................................... 395/200, 275, 395/325; 341/22–90, 21; 379/354; 364/709.16

[56] References Cited

U.S. PATENT DOCUMENTS

| | | | |
|---|---|---|---|
| 4,042,777 | 8/1977 | Bequaert et al. | 341/22 |
| 4,547,860 | 10/1985 | Lapeyre | 395/275 |
| 4,709,387 | 11/1987 | Masuda | 379/354 |
| 4,999,795 | 3/1991 | Lapeyre | 364/709.16 |
| 5,128,672 | 7/1992 | Kaehler | 341/23 |
| 5,311,175 | 5/1994 | Waldman | 341/34 |

Primary Examiner—Thomas C. Lee
Assistant Examiner—Marc K. Weinstein

[57] ABSTRACT

A computer input system implementing a chord keyboard, with particular structuring of the encoding scheme for the chord keyboard, and a method of visual feedback of the operation of the keyboard presented in that structured form. The available characters are divided into groups, and a stroke of a chord either selects an active row or selects a character from the active row. A display provides the status of the keyboard system, including what actions the user has taken, and indicates what characters will be input depending on the user's subsequent actions. When a chord is pressed, this display shows the character that will be input if this chord were to be released, and the user has the opportunity to change the chord selected without inputting an undesired character. One characteristic of the particular structure is the separation of sets of 10 characters into subgroups of 4, 3, 2, and 1 characters, these subgroups being accessed with chords of 1, 2, 3, and 4 fingers respectively.

12 Claims, 8 Drawing Sheets

CHORD KEYBOARD SYSTEM USING ONE CHORD TO SELECT A GROUP FROM AMONG SEVERAL GROUPS AND ANOTHER CHORD TO SELECT A CHARACTER FROM THE SELECTED GROUP

FIELD OF THE INVENTION

The present invention is a computer input system implementing a chord keyboard, with particular structuring of the encoding scheme for the chord keyboard, and a method of visual feedback of the operation of the keyboard presented in that structured form, in particular to allow a novice's mode of operation which is almost as intuitive and straightforward as hunt-and-peck operation on a traditional keyboard.

BACKGROUND

The vast majority of keyboards in use today for computers are traditional keyboards such as the QWERTY keyboard, the name QWERTY deriving from the first 6 letters of the first row. Other traditional keyboards include the Dvorak keyboard, an alternate arrangement designed to allow faster typing by optimum placement of the keys, and alphabetic keyboards, which are supposed to aid novice users in finding the desired keys. All of these traditional keyboards are distinguished by their characteristic that the user generally presses one key to enter each character. More specifically, these keyboards have a large number of character keys, and one or more shift keys. These shift keys may for example include a traditional upper-case "Shift" key, and also for computer usage other shift keys such as a "Ctrl" key and an "Alt" key. Pressing a character key transmits one character to the computer, but the character transmitted depends on the state of the shift keys. For example, pressing an alphabetic character key without the Shift key pressed will transmit a lower-case character, while pressing the same key with the Shift key pressed will transmit an upper-case character.

In contrast to the traditional keyboards described above, various types of "chord keyboards" have been used and/or proposed. A chord keyboard requires that the user generally press and release more than one key at a time in order to input a character. Chord keyboards have the advantage of requiring fewer keys than traditional keyboards, allowing the keyboards to be smaller, and also benefitting those users who have difficulty with the arm and hand motions required for operation of traditional keyboards.

In order to more clearly distinguish between traditional keyboards with shift keys, and chord keyboards, note that a traditional keyboard's shift keys are well-defined as shift keys, and generally do not input any character to the computer if pressed alone. A traditional keyboard's character keys are distinct from the shift keys, and when multiple key-presses are used on a traditional keyboard only one character key is pressed at a time (along with one or more shift keys). In comparison, although a chord keyboard may also have shift keys, a chord keyboard's character keys are often pressed together in order to generate a character not related to the characters that would be generated if the character keys were to be pressed separately. For traditional keyboards, if the user presses the key that would normally generate an "e" if pressed alone, and also presses the key that would normally generate an "s" if pressed alone, then he is likely to see "es" or "se" on his computer screen. But for a chord keyboard, this combination is likely to be defined as some other unrelated letter, perhaps an "h", not normally associated with either an "e" or an "s".

"Handprint chord keyboards" are a subclass of chord keyboards. A handprint chord keyboard may be strictly defined as one in which the number of keys has been so reduced so as to have only one key for each of the user's fingers. But the term "handprint chord keyboard" is more often used to refer to keyboards with more than one key per finger, but where the most common operations are performed with the primary key available to each finger, and only special operations are performed with the alternate keys for some fingers. A Braille keyboard, with one key for each of three fingers on each hand, and one key shared by the thumbs, is an example of a two-handed handprint chord keyboard as strictly defined with only one key per finger.

Handprint chord keyboards in general are appropriate for users with physical disabilities who cannot easily use a traditional keyboard, but who can operate the much smaller number of keys on the handprint chord keyboard. They are also advantageous for visually impaired or blind individuals, who may find it more difficult to learn to use traditional keyboards than sighted individuals because of their inability to easily find the desired keys on traditional keyboards.

U.S. Pat. No. 4,833,446, Eilam et al, describes a one-handed handprint chord keyboard with eight keys. (This is therefore not a handprint chord keyboard as strictly defined with only one key per finger). This represents the best prior art known for chord keyboards. The present invention will be shown to have numerous advantages over this prior art.

Handprint chord keyboards as strictly defined with only one key per finger would be especially advantageous for users with physical disabilities who might even have trouble moving each finger among its available keys. But chord keyboards which are presently available for computer input either are made as two-handed keyboards, or are provided with more than one key per finger, because it is very difficult to design a usable chord keyboard with only five keys and only one key per finger that can still input to the computer all of the myriad of characters that can be input by a standard computer keyboard. The present invention will accomplish this, where others have not.

A disadvantage of most chord keyboards is that "hunt-and-peck" operation is not possible. On a traditional keyboard, each key is labelled, and the user can hunt for each desired character key, and then press (peck) the key. This allows novice users to commence useful (albeit slow) operation of the keyboard with essentially no training, and then improve their input speed with practice. Although the fastest keyboard users undergo specific training for "touch typing" in order to achieve input speeds in excess of what they would normally achieve simply with practice, many users have not undergone that specific training and are simply former hunt-and-peckers who have increased their input speed with practice.

Some chord keyboards allow hunt-and-peck operation by utilizing only those combinations of keys which consist of adjacent keys, and labelling the keys or the space between them with the corresponding character so as to make it clear what chord (key combination) of adjacent characters is to be pressed for each character. This scheme is very effective, but the restriction of the available chords to only easily marked adjacent key combinations is sufficiently restrictive to require significantly more keys than would otherwise be required for a chord keyboard. Thus, the hunt-and-peck capability of the traditional keyboard is retained, but a significant portion of the advantage of the chord keyboard concept is not obtained.

Expert users of traditional keyboards (touch typists) do not need labelling of the keys, and similarly expert users of chord keyboards do not suffer from lack of labelling of the chord keyboard keys. But it is very important to allow something like hunt-and-peck operation for novice users, so that they can quickly become productive (albeit at a slow input speed). For some occasional users, the ability to use the keyboard at a slow input speed without much prior training is all they will ever need. For many others, eventual improvement of their input speed will be very important, and the ability to use the keyboard at a slow input speed without much prior training will be primarily valuable in that it will provide the user with sufficient incentive to keep working with it until the improvement in input speed is obtained. Also, if the novice user can input slowly, he will learn without seeming to work at learning, especially if the input system is particularly designed so as to guide him in this learning. And the novice user will be guided to learn as he uses the system slowly at first, especially if the novice's mode of operation of the keyboard requires more than just finding a character on a reference card and reading the required chord from the card. The present invention will require instead some small mental effort which is directly involved with the structure of the required chord, providing the novice user with much greater help in learning than he would get from simple use of a reference card. Therefore, a primary purpose of the present invention will be to provide a novice's mode of operation similar to hunt-and-peck operation, for a handprint chord keyboard (or for any type of chord keyboard), which guides the user to learn the system while he uses the novice's mode of operation for actual computer usage. This has been accomplished as will be seen below. Intermediate-level users, as well as novices, will also benefit from this design.

Chord keyboards, which were first proposed decades ago, have not been a commercial success. This is not only because the traditional keyboard established itself as the standard long before chord keyboards were proposed, but probably also because the traditional keyboard is so much more intuitive, that the user is much more comfortable approaching it. The chord keyboard will probably never become an extremely popular item, but with the improvements to the design of the chord keyboard provided by the present invention, as will be described below, the chord keyboard can be made to be much nearer to the intuitive nature of the traditional keyboard, so that those with some particular reason for using a chord keyboard (such as a physical disability which prevents them from comfortably using a traditional keyboard) will be much more likely to find the chord keyboard acceptable.

Various other methods of computer input are also of interest as background to the present invention. These additional methods are generally known as "adaptive software":

"Single switch scanning" is a computer input method which is commonly utilized by a disabled individual using a single switch, in place of a complete keyboard. (This should not be confused with computer input "scanners" of a different type which visually scan a document and input the document into the computer as graphical or textual information. This should also not be confused with the scanning operation of the electronics in almost any conventional keyboard as it interrogates the keys in a sequential fashion, unbeknownst to the user, in order to identify which keys are pressed and which are not pressed.) In a common form of single switch scanning, all of the characters which may be input are displayed on a portion of the computer screen, separated into rows or other forms of groups. The rows are highlighted in sequence at a predetermined rate. When the row containing the desired character is highlighted, the user presses his switch, selecting that row. The characters within the row are then highlighted in sequence at a predetermined rate. When the desired character is highlighted, the user presses his switch, selecting that character, which is input to the computer. This input method is much slower than use of a traditional keyboard or of a chord keyboard. But single switch scanning has the advantage of use by individuals who cannot utilize other keyboards (but can press one switch). Also, novices can learn to use scanning with almost no training, the use of the scanning system being almost as intuitive and straightforward as hunt-and-peck operation of a traditional keyboard. Heretofore, no chord keyboard has been developed which is anywhere near as intuitive as "single switch scanning". But, as will be seen below, the present invention is a chord keyboard that does approach the intuitiveness of "single switch scanning", and this is the most important reason why the present invention is a great advantage over the prior art in chord keyboards.

Their are various adaptive software products that allow a computer user to use a traditional keyboard, but to modify the behavior of the keyboard in order to help overcome some physical disability. For example, "AccessDOS" is computer software provided by IBM to assist disabled users with their computer input efforts with IBM-PC-compatible computers. Its StickyKeys, RepeatKeys, SlowKeys, and BounceKeys functionality falls in this category. For example, the SlowKeys functionality is helpful for a user who tends to tap keys unintentionally while preparing to press another key. It prevents the computer from accepting a key as pressed until it has been pressed for a given time period.

There are also computer access products that allow a computer user to use an external device, not normally part of the computer system, but which is specially connected to the computer system so that the user can input through that device. Again, "AccessDOS" provides a good example. Its "SerialKeys" capability allows a user with an external device to input to the computer system, as long as that external device has a serial port and can transmit appropriate signals through the serial cable to the computer system. The AccessDOS resident software in the computer system makes the computer applications believe that the user is really typing on the computer's regular keyboard.

Another computer input device, often used in addition to the computer keyboard, is the "mouse", the most common version of so-called "pointing devices". The user moves a small device around on the tabletop, and a "mouse cursor" correspondingly moves around on the screen. The mouse also has a small number of "mouse buttons", which are also used for computer input. Various computer access products allow the user to accomplish many of the functions usually accomplished with the "mouse", by operating some of the keyboard keys instead. Again, AccessDOS serves as a good example, with its "MouseKeys" functionality.

AccessDOS, like other adaptive software products that provide these sorts of functionality, does not work under all circumstances with all application programs. But this does not prevent AccessDOS and other similar programs from being invaluable for those disabled persons who need these capabilities. Often, the adaptive software provides them with full access to the application programs they wish to use. Sometimes they must operate application programs in slightly different ways than their able-bodied colleagues, and occasionally they must use different application programs than their able-bodied colleagues because of incompatibilities between the adaptive software and the applications. But AccessDOS and other adaptive software products operate with a large enough majority of computer applications, with little enough requirement to modify the manner in which those computer applications are used, that they are extremely valuable for those with physical disabilities who would have difficulty with their keyboarding if not for the help that the products provide. It is the aim of the present invention to provide this same assistance to many users with physical disabilities who have not found adaptive software products especially suitable for them before this time, in particular to those who have finger dexterity while they they do not have the arm or wrist mobility to use a regular keyboard comfortably. For example, individuals with muscular dystrophy tend to lose their gross motor skills (e.g. arm motion) while still retaining their fine motor skills (e.g. finger motion), and this invention is particularly suitable for such individuals.

Also of interest as background to the present invention is a keyboard designed for typing Japanese or Chinese characters. This is much more difficult than input of characters used in the American language, since there are far more Chinese or Japanese characters. A traditional keyboard for Chinese or Japanese characters, if implemented, would require a great number of keys. Various approaches have been taken to reduce the number of keys on such keyboards. One which is of particular interest here is a keyboard in which the left hand has a small array of shift keys arranged in a pattern, and the right hand has a large number of character keys each of which has a pattern of characters labelled thereon, the pattern of characters corresponding to the pattern of left-hand shift keys. The user utilizes the left-hand shift keys in order to select which character is desired on a particular character key, and then he presses the right-hand character key in order to input that character to the computer. It should be noted that this is not a chord keyboard, but is simply a conventional keyboard with a larger-than-usual number of shift keys, since only one of the right-hand character keys is pressed in order to transmit a character to the computer, and pressing two of the right-hand character keys will likely yield the two characters input sequentially, not a different character entirely. This input method shares a number of important features with "single switch scanning", in that the user first must select a group (by pressing a shift key), and then must select a character from the group (by pressing a character key), with the means for selection of a group or of a character being quite intuitive. This very beneficial feature of both "single switch scanning" and of the Chinese/Japanese keyboard has not heretofore been seen in chord keyboards, probably because it is so difficult to design a computer input system which can merge the chord keyboard concept with the group/character selection concept in an appropriate manner so that the user finds the behavior of the system sufficiently intuitive. As will be seen, the present invention has accomplished this, providing a chord keyboard which is far superior to the prior art.

SUMMARY OF THE INVENTION

The preferred embodiment of the present invention is a computer input system, implementing a right-handed one-handed five-key chord keyboard, with several important improvements over the prior art in chord keyboards.

The characters which may be input using the chord keyboard are presented to the user in a chart, arranged as 10 rows of 10 characters each (plus an extra row in addition, called the control row, which will be described more later). This chart is presented on the video display of the computer system, using a portion of the video display area while regular applications run on the remainder of the display.

The user is provided with means for selecting an active row (group) of the chart, and also with means for selecting a character from whichever row (group) is presently active. This is very similar to the "single switch scanning" input method, but the means provided in the present invention is much faster, in that the user can make any row active, or select any character from the active row, with only one chord pressed. He does not have to wait for the computer system to scan down to the desired row, or to scan across to the desired character. An additional advantage is that the user often wishes to select another character from the same row as the previous character, and for the present invention he may bypass the step of selecting a row again as he would have to do with single switch scanning.

The rows of the chart are very similarly presented, each row being organized and displayed on the screen in the same manner as the other rows. This provides a correspondence between characters in various rows. The means for selecting a character in its row is then the same as the means for selecting the corresponding character in the corresponding character's row. Thus having learned the means for one row, the user has learned the means for all rows.

The means for selecting an active row from among the 10 rows is essentially the same as the means for selecting a character from the active row, except that the user presses the thumb key along with the other keys. Thus having learned the means for selecting characters, the user has almost learned the means for selecting rows.

The characters in the rows (groups) are further divided into subgroups, and the rows themselves are further divided into groupings of rows. The chord combinations used to select a new active row, or to select a character from the active row, are chosen in a manner which corresponds to this subgrouping and row grouping, which makes it easy for the user to learn very quickly how to use the system.

As for most chord keyboards, the selection action (selecting either a row or a character) is done on release of the keys. As the user manipulates the keys of the chord keyboard, the display of the chart of characters is modified to represent the changed state of the system, including a clear indication of the action that would be taken if the user were to release all keys at that time. This provides visual feedback to the user that helps overcome the usual limitation of chord keyboards, which is that there is no equivalent to having the novice user of a traditional keyboard check the inscription on the keycap to insure that he has the correct key prior to tapping the key. With the present invention, the user can see what he is doing at all times, and can see what he will be doing if he makes the currently pending selection. This allows him to correct his errors before inputting incorrect characters to the application program.

The above improvements to chord keyboard technology make the present invention very easy to understand and learn. New users become quite comfortable with the system during a very short introductory session. This encourages acceptance of this computer input system by potential users. Many chord keyboards in the past have failed to get users sufficiently comfortable with their operation soon enough to convince them that they want the system. This present invention goes far in overcoming this initial hurdle of acceptance.

For experienced users who need only occasional reference to the locations of characters in the structure of the chart, there would be no need for the video display of the chart of characters. The experienced users would be provided with a reference card illustrating the chart, which they could use as needed.

Several alternative embodiments of the present invention are also described herein. A two-handed version allows choice of the row with the left hand, and the character within the row with the right hand, increasing the input speed at the expense of having to use two hands. For the one-handed or two-handed versions, activation of each chord press can take place upon operation of a separate "strobe" switch instead of by lifting of all the chord keys within a short time interval, which is beneficial for those users who find it difficult to release all keys at nearly the same time.

DETAILED DESCRIPTION OF THE INVENTION

Figure 1:
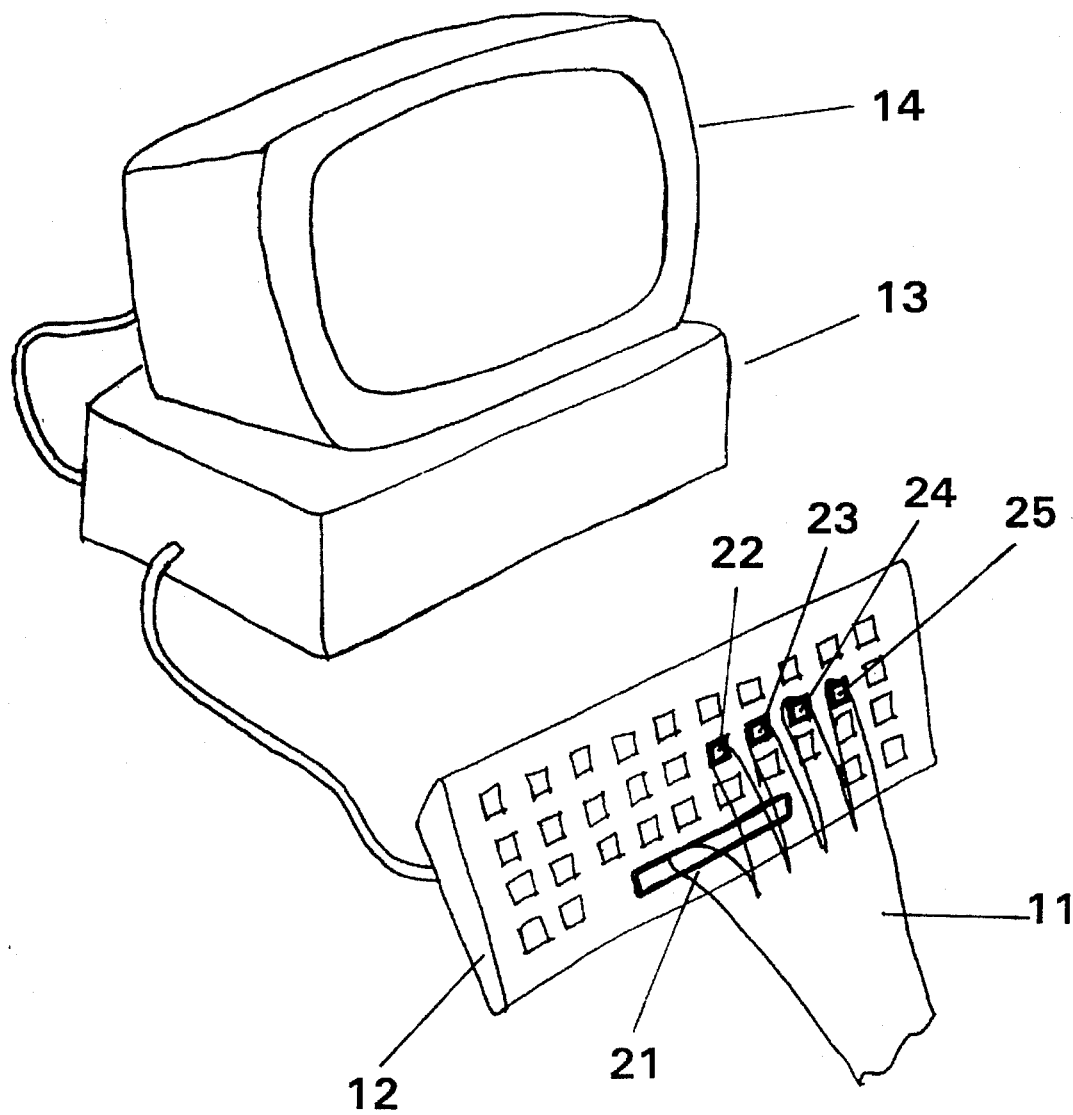
FIG. 1 illustrates a computer system with a user's hand operating the system using the preferred embodiment of the present invention.

In the preferred embodiment of the present invention, the user rests the five fingers of his right hand on a standard computer keyboard, one finger on each key. For example, the user may utilize the typist's home row keys for the right hand. This is shown in FIG. 1, where the user's right hand 11 is placed on the computer keyboard 12 while operating the computer 13 with video display 14. The thumb 21 and fingers 22 through 25 of the right hand are positioned so as to operate the space bar with the thumb 21, the "j" key with the index finger (first of four fingers) 22, the "k" key with the middle finger (second of four fingers) 23, the "l" key with the ring finger (third of four fingers) 24, and the ";" key with the little finger (fourth of four fingers) 25.

The user will then operate the computer solely with motion of these five keys, not requiring that he have the ability to move his wrist or arm as would be necessary to operate a standard keyboard in the traditional manner, and not even requiring that he have the ability to move his thumb or any of his fingers to any key other than the key it is resting on.

Figure 2:
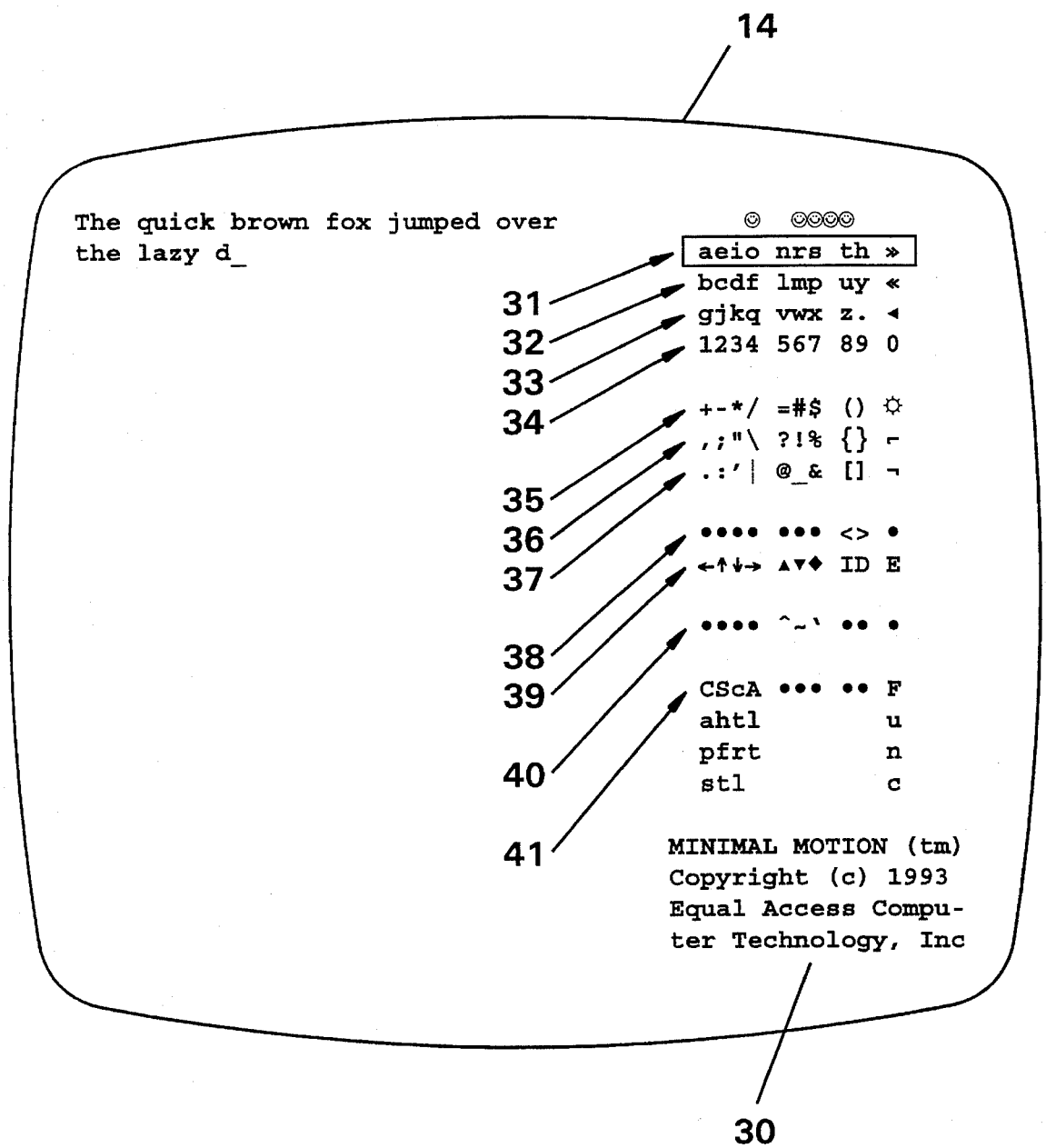
FIG. 2 illustrates the appearance of the video display during operation of the present invention.

As shown in FIG. 2, the video display 14 presents the user with a chart 30 of available characters from which to select a character for input to the computer. The characters are structured, or organized, into groups, the characters for each group being displayed on a single row of the chart. Therefore, as shown in the figure, the first group 31 consists of the characters a, e, i, o, n, r, s, t, h, and a double-right-arrow symbol which represents a space. The second group 32 consists of the characters c, d, f, l, m, p, w, u, y, and a double-left-arrow symbol which represents a backspace. And so forth for the other groups. The application program running on the computer system is a word processor, to which the user is "typing" characters.

FIG. 2 shows the first group 31 highlighted (reverse video in the computer code implementation, but enclosed in a rectangle in the figure). This highlighting indicates that it is active. With this first group active, the user can input any character in the group to the computer using some combination of the four fingers of his right hand.

Figure 3:
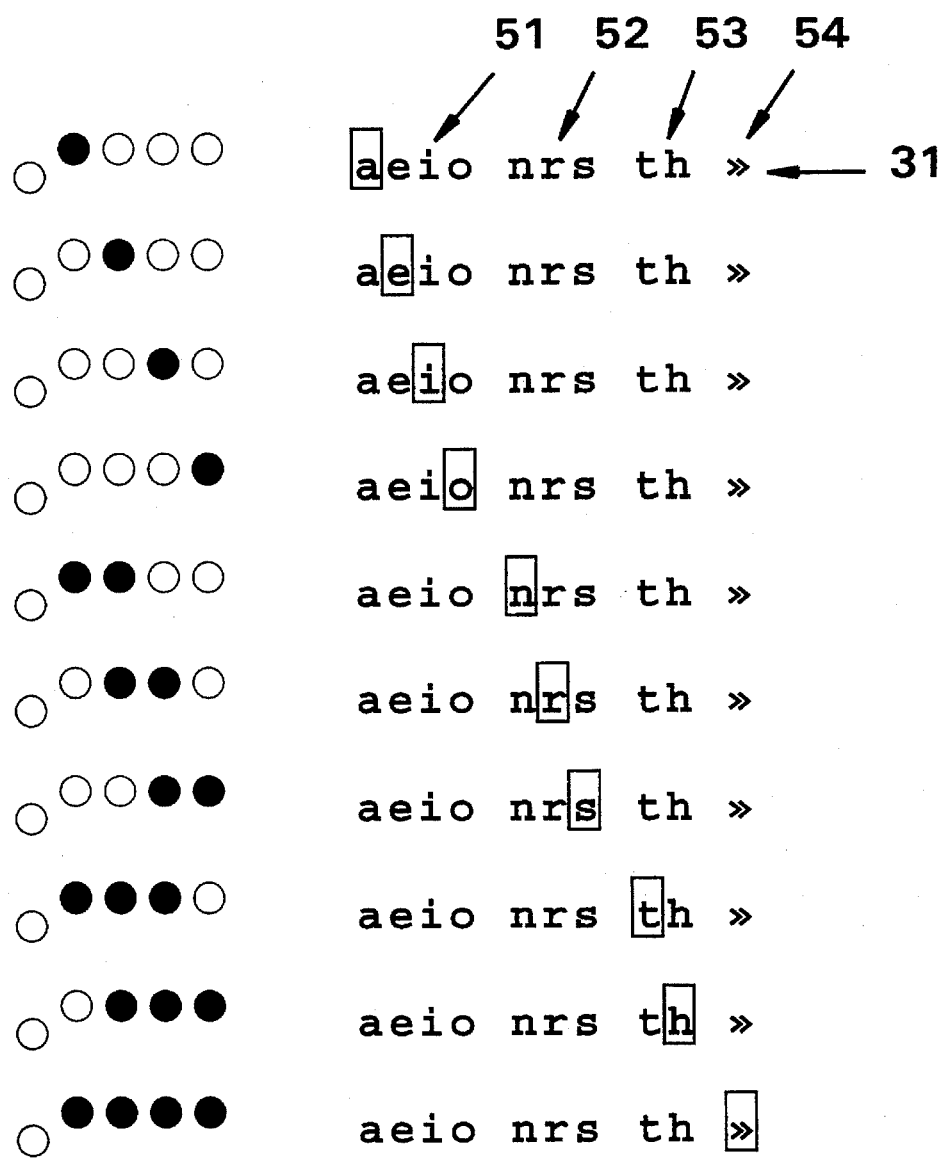
FIG. 3 illustrates the means for selecting a character from the first row of the chart when that row is active.

FIG. 3 shows the first group 31 and the chords (key combinations) which select the individual characters in the group. The figure illustrates the chords with five circles representing the thumb and the four fingers, and the filled-in circles indicate that the corresponding key is pressed. Note that the group of characters is further subdivided into subgroups of 4, 3, 2, and 1 characters respectively, and the chords required to select characters from each of these subgroups will be described separately:

In the first subgroup 51, which has four characters, the user operates only one of his fingers at a time. In order to input the letter "a", the user uses the first of his four fingers. For the letter "e", he uses the second of four fingers, for the letter "i" the third of four fingers, and for the letter "o" the fourth of four fingers. Thus, with only one of his fingers, he can input any of the four characters in this subgroup.

In the second subgroup 52, which has three characters, the user operates two adjacent fingers at a time. In order to input the letter "n", the user uses the first two of his four fingers. For the letter "r", he uses the middle two of four fingers, for the letter "s" the last two of four fingers. Thus, with two of his fingers, he can input any of the three characters in this subgroup.

In the third subgroup 53, which has two characters, the user operates three adjacent fingers at a time. In order to input the letter "t", the user uses the first three of his four fingers. For the letter "h", he uses the last three of four fingers. Thus, with three of his fingers, he can input any of the two characters in this subgroup.

In the fourth subgroup 54, which has just one character, the user operates all four of his fingers. Thus, with all four fingers, he can input a space character.

This means for selecting a character from among the characters in the active group, as described above for the first group, applies to all of the groups. Whatever group is active, there will be one row of the chart highlighted to show that it is the active row, and there will be 10 characters on that row of the chart illustrating the characters that the user may input by operating his four fingers either singly or in some combination. The characters on the active row will be divided into subgroups of four, three, two, and one characters respectively, and characters in these subgroups are respectively accessed by pressing one, two, three, or four adjacent keys simultaneously. And as the groups of adjacent simultaneously-pressed keys go from left to right, so the character chosen within the subgroup goes from left to right.

Usually, the characters on the chart obviously represent the character to be input, as in the case of the letters of the alphabet, or the numerical digits. But in some cases, the display shows some character which represents another character, such as on the first row, where the double-right-arrow represents the space character. The other such characters are as follows: On the second row, the double left arrow represents the backspace character. On the third row, the heavy left arrowhead represents the enter key character. On the fifth row, the sun symbol represents the escape character (think of escaping to a sunny vacation spot). On the sixth row, the horizontal line with the descender on the left represents the backtab character. On the seventh row, the horizontal line with the descender on the right represents the tab character. On the ninth row, the 4 arrows represent the cursor direction key characters, the heavy up and down arrowheads represent the page-up and page-down characters, the diamond represents the home key character, the "I" represents the Insert key character, the "D" represents the Delete key character, and the "E" represents the End key character.

Given the instructions provided above, the user can now input any character he sees on the highlighted row (active group) of the chart. In order for this invention to be very useful, the user must also be able to select a new active row at any time. This is accomplished in a manner very similar to that for selecting a character from the active row:

Referring again to FIG. 2, note that there are 10 rows 31 through 40 on the chart, and that these rows are separated into a first row grouping of four rows, then a second row grouping of three rows, then a third row grouping of two rows, then a fourth row grouping of a single row. This is the same subdivision as for the characters in a row that was described above. And the means for selecting an active row is almost identical to that for selecting a character in the active row. If the user presses the space bar with his thumb while pressing a combination of the keys with the four fingers, then he will select a new active row. The chord combinations which he uses to select an active row are exactly the same as those which would select the corresponding character from the present active row, except that the thumb is added to the chord. Thus, for example, the thumb with the first of four fingers will select the first row 31, . . . the thumb with the first two of four fingers will select the fifth row 35, . . . the thumb with the first three of four fingers will select the eighth row 38, . . . and the thumb with all four fingers will select the tenth row 40.

With the above instructions, the user can input characters to the computer by a hunt-and-peck method, having learned only a small set of rules as to how to operate this present invention. He first looks for the character he wishes to input next, looking on the chart as a novice user of a traditional keyboard would look at the keyboard. As for a traditional keyboard, he would usually find a position where the character itself were labelled, but sometimes he would find a symbol or abbreviation in its place, like the double-left-arrow used in the chart for the backspace character, or the left-arrow often used on the backspace key of a traditional keyboard. For the traditional keyboard, he would then simply press the labelled key, and admittedly he will have to do more than this in order to operate the present invention. But although he will have to do more, what he will have to do is very intuitive and has proven to be easily learned in a very short time. First, if the row on which he finds the character is not the active row, he needs to select that row as the active row by pressing his thumb on the space bar, and simultaneously pressing a combination of his four fingers, according to the easily-remembered rules presented above. Then, he selects a character from the active row by pressing a combination of his four fingers without the thumb on the space bar.

Clearly, the hunt-and-peck method for the present invention is not as easily learned as the hunt-and-peck method on a traditional keyboard. There is no argument made here that ordinary users should switch from using a traditional keyboard to using a chord keyboard of the type described here or of any other sort. Most users will find a traditional keyboard more convenient and appropriate. But there are users with physical disabilities who cannot comfortably use a traditional keyboard, due to arm or wrist mobility problems. For such users, the small amount of learning required to use the present invention, and the slightly greater effort required to select characters using the present invention, are great advantages over other computer input methods, including other chord keyboard input methods, which they have been heretofore offered.

There is one additional row available on the chart, which was not referred to above. This last row 41 is the "control row", and this row is made active by simply pressing the space bar alone. The labelling of this row on the chart is different from the other rows, in that the labelling may have up to four characters displayed for each position in the row. Reading vertically, the first character position shows "Caps", the second shows "Shft", the third shows "ctrl", the fourth "Alt", etc.

The implementation of the present invention which is presented here includes the functionality necessary for simple word processing. The printable characters on the keyboard, including lower case and upper case for the letters, are implemented. The usual word processor control characters, such as insert and delete, are implemented. The function keys, alone or combined with Shift, Ctrl, or Alt are implemented. Some additional characters are not implemented, but are not important for such word processing, and in any case could be implemented if desired by one skilled in the art.

The Caps, Shift, Ctrl, Alt, and Func "characters" are activated in a slightly different manner than all of the characters in the top 10 rows. When each is "typed" once, an open smiley-face appears below it to indicate that it is temporarily activated, and will apply only to the next character typed. "Typing" it again fills in the smiley face, indicating that it is permanently activated. And "typing" it yet again eliminates the smiley-face, indicating that it is again inactive. Thus, to input the function key F4 to the computer, activate Func once, then "type" a '4'. An F4 will be input, and the smiley-face under Func will disappear. To start a sentence with a capital letter, "type" Caps once, and then "type" the sentence. To input a sentence with all capital letters, "type" Caps twice instead of once, and when the sentence is finished "type" Caps again to deactivate it. (This is the same manner as the Capitals prefix is used in Braille.)

In the general description of the present invention provided above, it was mentioned that the user simultaneously presses a chord of keys in order to obtain the desired selection action (selecting a new active row, or selecting a character from the active row). This is not strictly true, and the selection action will now be described in more detail:

The selection action does not take place on pressing of the keys, but rather on lifting of the keys. It is necessary for the user to lift all of the chord's keys within a short time period, in order for the software to understand that he wishes to take the action designated by that particular chord. Although this is unexpected for those familiar with ordinary keyboard usage, it is appropriate for chord keyboards. Most importantly, for chord keyboards, there are ambiguities when an individual is pressing keys, as to whether he has completed pressing all the keys of the chord or whether he has yet to press an additional key before the chord is complete. One user may approach a chord keyboard and press the keys of the chord not very simultaneously, over a period of perhaps ¼ or ½ second. Another user may press and release all of the keys of the chord within a much shorter time. Until the second user releases at least one of the keys, it is unclear whether or not he is a slow or a fast user. The ambiguity cannot easily be avoided if we have the selection action take place on pressing of the keys. The ambiguity is easily avoided if the selection takes place on release of all the keys. The chord keyboard that selects on release of all the keys can be used by a novice without requiring him to rush, and can also be used by an experienced user without slowing him down.

So it is seen that the selection of a group or of a character which was previously described is actually two separate actions, first to press the chord keys in order to tentatively make the selection, and second to release the chord keys almost simultaneously in order to accept the tentative selection.

The present invention makes use of this usual chord keyboard characteristic of having the selection action take place on release of the keys, in order to provide the user with an additional capability to test out a chord he thinks is correct before actually using it to make a selection. This additional capability is called the "rollover" capability. When the user presses a set of keys, the video display shows him what the effect of his action would be if he were to then release all of the keys. If he is pressing a chord that would select a new active row, then the display will show that potential new active row highlighted. If he is pressing a chord that would select a character from the currently active row, then the display will show the current active row highlighted, the potentially selected character blinking, and the entire column containing the potentially selected character highlighted. The novice user can press the chord and hold it down while he inspects the display. If the display indicates that the desired character is indeed ready to be selected, then he he releases all of the chord's keys within a short time period. But if the display indicates that the chord combination was not correct for the desired character, he can then "roll over" to another chord to correct his error. That is, he changes the set of keys pressed to the new chord while maintaining at least one key pressed at all times. If he doesn't maintain at least one key pressed at all times, then the software will consider that he has purposely released all the keys, and will take the selection action that was indicated by all of the keys that were released within a short time period. But as long as he keeps at least one key pressed, the software will simply update the display to reflect the new potential action based on the new chord. (The software will not update the new potential action until the short time period expires, since when a user releases all the keys within a short time period in order to take the selection action indicated by the display, it would be inappropriate for the display to change in the process of his almost but not quite simultaneously releasing the chord's keys). It should be noted that nothing in this procedure slows down a fast user's operation of this computer input system. The only time a user needs to delay slightly, and let the system catch up with him, is when he has pressed the wrong chord and is "rolling over" to the correct chord.

The preceding "rollover" capability is a very powerful and unique capability for chord keyboards, a great improvement over the prior art in chord keyboards. Prior art chord keyboards do not allow the novice user, who may be unsure of his chords, to "check out" any particular chord at any time, without having to go back and correct his mistake if it is wrong.

The aforementioned characteristic of chord keyboards, that the chord's selection action occurs on release of the keys instead of pressing the keys, makes it difficult to implement the valuable "typematic" feature of traditional keyboards in the environment of a chord keyboard. When a key is pressed on a traditional keyboard, the character it represents is immediately input to the computer. Then, if the key is held down, after an initial time period (generally ¼ to 1 second), the character represented by the key is repeated continuously at a rapid rate (generally 2 to 30 repetitions per second) until the key is released. This is exceptionally helpful to the user, especially when typing a long line of repeated characters, or when using the cursor control keys to move the cursor a significant distance on the video display. The "typematic" feature has been previously implemented for chord keyboards, where pressing a chord causes repeated input of the character after an initial delay period, but this requires that the chord keyboard respond to key-presses, and not wait for key-releases, and so the ambiguities described above can cause serious problems. The present invention provides a greatly improved "typematic" capability for chord keyboards. In this implementation, a chord will provide "typematic" response only if it is a repetition of the chord just previously input. Thus, in order to activate the "typematic" behavior of a particular chord, the user must press and release the chord once (inputting the character once), and then press the same chord again and hold it down (inputting the character repeatedly, after an initial delay period), releasing it when he wishes to halt the "typematic" behavior. The novice user can still work slowly as he presses keys slowly, inspects the chart to see if he has the desired chord, rolls over to a new chord, and so forth, as long as he does not repeat the previous chord actually input, which he is unlikely to do. If he is purposely repeating a chord in order to get a double letter, then he will tend to press and release the chord quickly for the second copy of the letter since he will be sure of the chord combination to be used having just accomplished the first copy of the letter. Therefore, he is not likely to activate the "typematic" behavior accidentally in the course of typing a double letter. If novice users desire to have even more protection from accidental activation of the "typematic" feature, then the system could be set to activate only on the third or fourth repetition of pressing the same chord.

A very important additional benefit of the present invention is that the chart on the video display, and its quick response to the user's actions showing the effect of the user's actions, is an excellent aid to learning for the user. That is, the structuring of the characters in the chart as described above and the operation of this input system not only helps the novice user by providing a hunt-and-peck approach with little training, and not only provides the "rollover" capability which allows the user to correct mistakes before they are input to the application program, but it also provides a vehicle by which the user will more quickly learn to be a proficient user:

When a user looks up the chord for a character on a listing of chords for a conventional chord keyboard, there is no special assistance that the user is getting in order to help the user learn the chord. It is simply a matter of repetition. Some chord keyboards present the chords in a more easily remembered fashion, such as a separation of chords into groups where each group has some relationship between the chords in the group, and there is also some relationship between the characters in the group such as their forming an easily-remembered word or nonsense-word. Other chord keyboards present the chords as patterns that correspond in some way to the outline of the letters. Both of these approaches help somewhat. But the present invention has major advantages over these conventional chord keyboards in the manner in which it helps the user learn the chord combinations:

First, for the present invention the means for selection of a character from among any group is the same as the means for selection of a character in the corresponding position of any other group, while this is not true for other chord keyboards that present the characters as being divided into groups. The closest similar characteristic in the prior art is the use of a shift key to select between the group of lower case characters, and the group of upper case characters.

Second, the means for selecting a group to be active is essentially the same as the means for selecting a character within the active group, and this further helps the user learn the system quickly.

Third, and perhaps most importantly, the structure of this input system is designed to help (and almost force) the user to learn the system without having to think about learning the system, because the means for selecting groups and the means for selecting characters within groups utilize the structure of the division of the characters into groups, and of the division into subgroups, and of the division of the groups into row groupings, so that the user constantly has this structure reinforced as he uses the system. This is a great improvement even over other chord keyboards where the characters have been presented as being divided into groups, because for those other keyboards the operation of the keyboard does not require the user to work directly with the groups, so the user is so much less likely to get reinforcement of his learning while using the keyboard.

Given all of the advantages noted above, and noting how these advantages have been accomplished, it is seen that the structure of the chart is of great benefit to the user, and the visual feedback is of great benefit to the user, but the greatest benefit to the user comes from the combination of these two features. Both the novice's hunt-and-peck method, and the "rollover" capability, depend on the synergy of these two features.

The video display of this input system shows not only the chart as described above, but also shows at the top indicators of which keys are pressed at any given time. This may assist the novice user as he learns to use the system, and it may also assist even an experienced user with his sensory perception of which fingers are pressing keys.

Note that there are some available chords of the finger keys not utilized in the above scheme. Non-adjacent chords, for which the pressed keys are not all consecutive, are missing from the above scheme. This means that they are not utilized as part of the above structured encoding scheme, but it does not mean that they are not utilized at all. For example, as implemented by the computer code provided, the "fork" chord (first and fourth of four fingers) on the three rows that have letters of the alphabet operates in the same manner as the Caps character on the control row. This provides the user with convenient capitalization of sentences without having to select the control row, select the Caps character, and then reselect one of the rows with letters. Some of the other non-adjacent chords may be left unutilized, and others may be utilized in other appropriate ways.

It should be noted that an additional advantage of the present invention is that, unlike a novice user on a traditional keyboard, the user need not look at the keyboard device. All of the visual information he needs is on the screen, which is where he also finds the application program's display as well, both conveniently located in the same place. This is advantageous for those who cannot easily see the keyboard device because of the nature of their physical disability, and also it helps to avoid the difficulty of regularly moving ones visual focus between two disparate locations.

Some comments are in order concerning the arrangement of the character encoding in the chart, even though the particular arrangement is not an important part of the present invention. First, the letters and numbers are placed at the top, as it is expected that they will be used most often. The most common letters are put on the first row, the next most common letters on the second row, and the least common letters on the third row. The space and backspace, period, and enter key are also placed here as they are used often. The numbers are placed on the fourth row. Within each row of letters, the letters are divided into the subgroups of 4, 3, 2, and 1 characters with some consideration given to which subgroups of characters would assist the user with his learning of the system. For example, the four common vowels were put together. A simple analysis of the frequency of adjacencies of letters in textual information was then compared with the arrangement, and some minor adjustments were made in order to put on the same row letters that were most likely to occur adjacent to each other.

There is additional structuring of the character encoding, for the non-letter characters. For example, the parentheses are displayed as a subgroup of two characters. And the square brackets, braces (curly brackets), and sharp brackets (actually less-than and greater-than signs, but sometimes utilized as brackets) are placed in the corresponding character locations in other rows. The mathematical operators +—*/ are placed in a subgroup of four characters reflecting their natural association. The space and backspace are in different rows but are selected from those rows with the same chord; likewise the colon and semicolon; likewise the tab and backtab. All of these aspects, and other similar aspects of the character encoding are hopefully going to assist the user with his memory of the locations of the various characters, in addition to all the other help he has already received from other beneficial aspects of the present invention.

IMPLEMENTATION

Implementation of this computer input scheme with the use of a traditional keyboard device is straightforward for an individual skilled in the an of programming resident software for the target computer. Implementation with an IBM-PC-compatible computer will be described here. These computers have a keyboard with built-in computer processor which transmits a signal to the computer on each key-press and on each key-release. The built-in "BIOS" computer code, and the "operating system" computer code, usually interpret these signals and translate them into the desired character (although in some instances the application program does so itself). These operations take place within the computer's central processor, but this functionality is invisible to the user. Where the above general description has referred to a traditional keyboard inputting or transmitting a particular character to the computer, what actually happens is that the keyboard and its internal processor send some signals to the computer, and the hidden operations of the computer's BIOS and operating system computer code interpret these signals in such a way as to determine what character is intended.

Many of the software capabilities required for implementation of the present invention are commonly known. For example, utility programs known as "keyboard enhancers", such as SuperKey or ProKey, are available for computers including IBM-PC-compatible computers. These keyboard enhancers are installed as auxiliary portions of the operating system software, usually as "terminate-and-stay-resident" (or "TSR" or "resident") programs which are installed when properly mentioned as a DOS command either in the AUTOEXEC.BAT file or at some later time. They are installed in a manner whereby they appear to the user to be part of the operating environment after they have been installed. These keyboard enhancers provide additional functionality for the user, above that functionality which is provided by the ordinary computing environment and the application programs. For example, keyboard enhancers provide a "macro facility" wherein the user can define a particular character when input from the keyboard to be expanded by the keyboard enhancer, according to "macros" defined by the user, resulting in a string of characters to be transmitted to the computer in place of the single character. This functionality includes the capability to monitor keyboard activity, prevent the application program from seeing the actual keyboard activity, and presenting the application program with characters for which there was no actual keyboard activity but which the application program believes were provided by ordinary keyboard activity. And these capabilities, which are well-known by those skilled in the art, are the most important capabilities required to implement the present invention. Since the technology to construct a keyboard enhancer will be available to those skilled in the art, the description herein of the implementation of the preferred embodiment of the present invention need describe only what other components are necessary in addition to this known technology.

Keyboard enhancers have a portion of their process activated each time a key on the regular keyboard is either pressed or released. The keyboard enhancers usually ignore occurrences of release of a regular character key, but they must actively ignore such release. That is, the portion of their process that handles keyboard events is activated every time a key is either pressed or released, and the process in a keyboard enhancer checks for what type of event has occurred, and then determines that no action is necessary if this was the release of a regular character key. Therefore, it will be clear to those skilled in the art that a keyboard enhancer has the key-release as well as the key-press information available as will be needed for implementation of the preferred embodiment of the present invention.

Keyboard enhancers usually do not maintain a display on the screen continuously while they are operating in the background. However, other utility programs available for these computers do continuously display status information on the computer display screen while they are operating in the background. For example, one such form of utility program will display the time of day on the screen, as if the user had affixed a small digital clock to a portion of his computer screen. The technology required to accomplish this display, by a utility running in the background, on a portion of the computer screen is easily available to those skilled in the art, and will be used as part of the implementation of the present invention.

Again referring to the available utilities that display time on the screen, those skilled in the art will be aware that the time of day is easily available to these utility programs in terms of the number of "ticks" since midnight, the ticks incrementing at the rate of 18.2 per second. Thus, any utility program which requires timing information based on the number of such ticks that have elapsed has such timing information readily available. Implementation of the preferred embodiment of the present invention will not require any more than this timing information, so this very straightforward method of timing will be utilized for this implementation.

The portion of the keyboard enhancer process which must be modified in order to implement the preferred embodiment of the present invention, is the portion which accepts information about keyboard events (key-presses and key-releases), keeps track of the important information about what previous keyboard events have occurred, and determines what character(s) (if any) to simulate as being typed on the regular keyboard. This portion of the keyboard enhancer will need to be replaced by a somewhat more involved process, in order to implement the preferred embodiment of the present invention. Computer code is provided herein which accomplishes this implementation, but as an aid to the reader, some flowcharts and some additional discussion of the process are also provided:

Computer source code which implements the preferred embodiment of this invention is provided herein. The computer program code provided is an implementation of the present invention for IBM-PC-compatible computers running the MS-DOS operating system, which represents the majority of the computers in operation today. This does not imply that the invention is limited to this class of computers. This is simply a convenient way of illustrating the operation of the invention. The same process could also be implemented on IBM-PC-compatibles running Windows, on Macintosh computers, etc. All that is required is that the computer processor get a signal every time a key is either pressed or released, and that the computer processor have the ability to pretend, for the benefit of the application program, that certain keyboard activity happened which did not really happen. For those computers which don't send a signal on key-release, or otherwise do not allow such resident software, then the same process can be implemented with hardware and software external to the usual computer system hardware and software, and then the electrical signals fed from the external hardware and software to the original computer system in a way that the original computer system thinks they came from the conventional keyboard. The process is the same, with the implementation differing primarily in that external hardware is used.

The source code provided also implements some of the alternative embodiments which will be mentioned below. The computer code as presented will implement the preferred embodiment (one-handed right-handed five-key version) if the F1 key is pressed immediately after the program is loaded.

The implementation provided herein allows the user to redefine which keyboard keys he will use for this input system, if the typist's home keys of space bar and jkl; are not suitable. Actually, the typist's home keys are not very comfortable for many individuals, so this is an important feature. Simply press F3 at any time, and then press the new keys to be defined, one at a time, from left to right. Note that not all combinations of keyboard keys will work with this system, depending on the particular keyboard's internal electronic design, but most arrangements of keys that users choose to use will work with most keyboards.

Some of the computer source code provides generic capabilities common to many resident programs, and particularly to keyboard enhancers as mentioned above, such as installation of the resident program, optional de-installation, recognition of keyboard activity and activation of appropriate computer code to respond to keyboard activity, "stuffing"

of characters into application programs as if they were typed on the keyboard, etc. These generic capabilities are well known in the field, as noted above, and one skilled in the art of implementing resident programs does not need to be shown how to accomplish these capabilities. However, in order to make the implementation of the preferred embodiment more complete and perhaps easier to understand, some source code which accomplishes these capabilities is included.

The source code provided herein for the generic capabilities mentioned above is copied from a popular magazine's column showing a utility which records keystrokes and plays them back later, not any sort of chord keyboard at all, but requiring the same generic capabilities as the present invention. This source for the generic capabilities has been used because they can be provided herein along with the source code for implementing this particular invention, providing a complete and consistent presentation for the reader. The copyrighted source code from the magazine's column is permitted to be copied and hence to be used herein to help educate and inform the reader, but not to be utilized in a commercial product. One skilled in the art will recognize that these generic capabilities could be replaced easily. There are a number of commercially available TSR developer's systems, for example the CodeRunner package available from Omega Point, which provide similar generic capabilities, and in fact provide additional or improved capabilities in some of these areas, such as loading the TSR program at least partially into EMS (LIM) memory to save space in the regular memory, allowing the computer code to access disk files in the background while the foreground application is running, improved methods for simulating keypresses to the foreground application, and so forth. Substituting these commercially available generic capabilities, or other implementations available to those skilled in the art, would be straightforward and would be more suitable for a commercial implementation of a computer input system, but use of the magazine's source code is more appropriate for this presentation of the process to the reader at this time.

Figure 4:
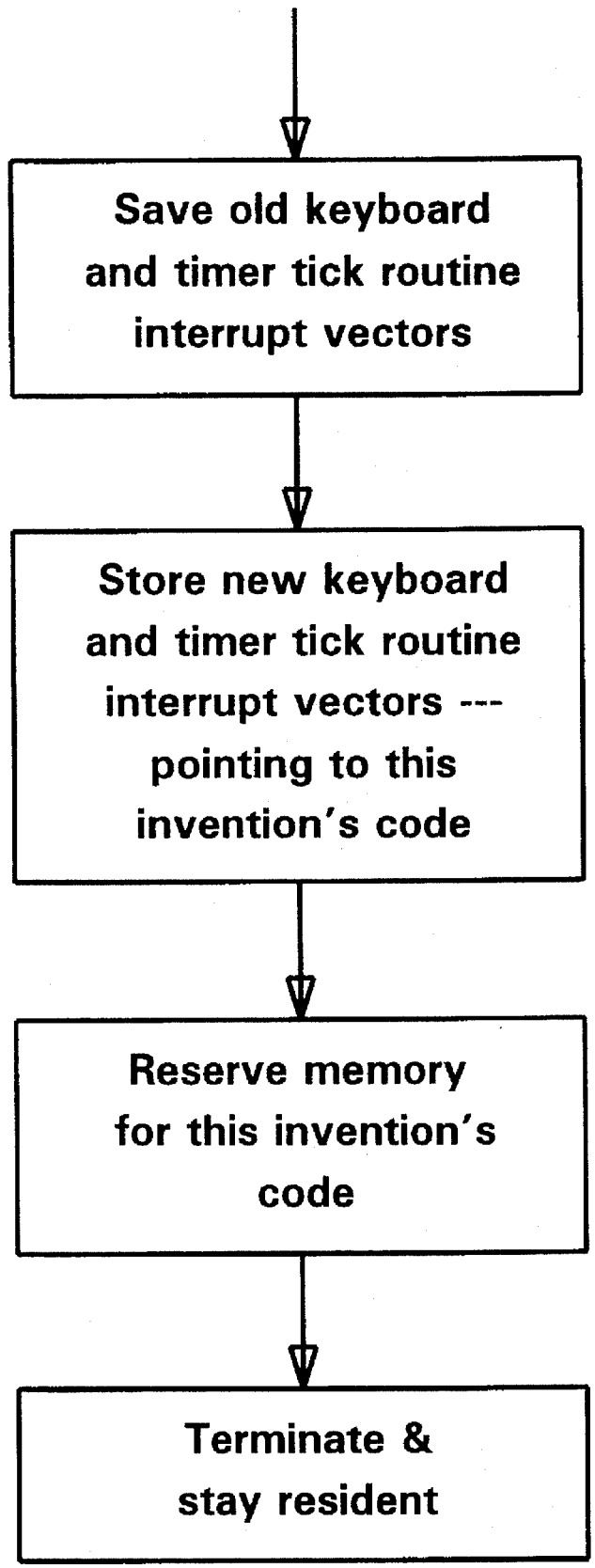
FIG. 4 is a block diagram illustrating important steps in the initialization routine.

Although the entire implementation of the invention is accomplished by the computer source code provided, flowcharts are provided showing the most important steps, in order to assist the reader in understanding the function of the computer code:

FIG. 4 shows the initialization procedure. This initialization is commonly found in resident programs, so one skilled in the art of implementing resident programs will not find any surprises here. Some additional capabilities, such as saving computer memory resources by releasing environment space, or providing the user with the ability to remove the program from its residency in memory, are not noted in the flowchart since they are incidental to the present invention.

The initialization procedure sets up the computer code so that it can operate later if activated. All of the remaining operation of the computer code is accomplished by the keyboard interrupt procedure and by the timer interrupt procedure, which are described below.

Figure 5:
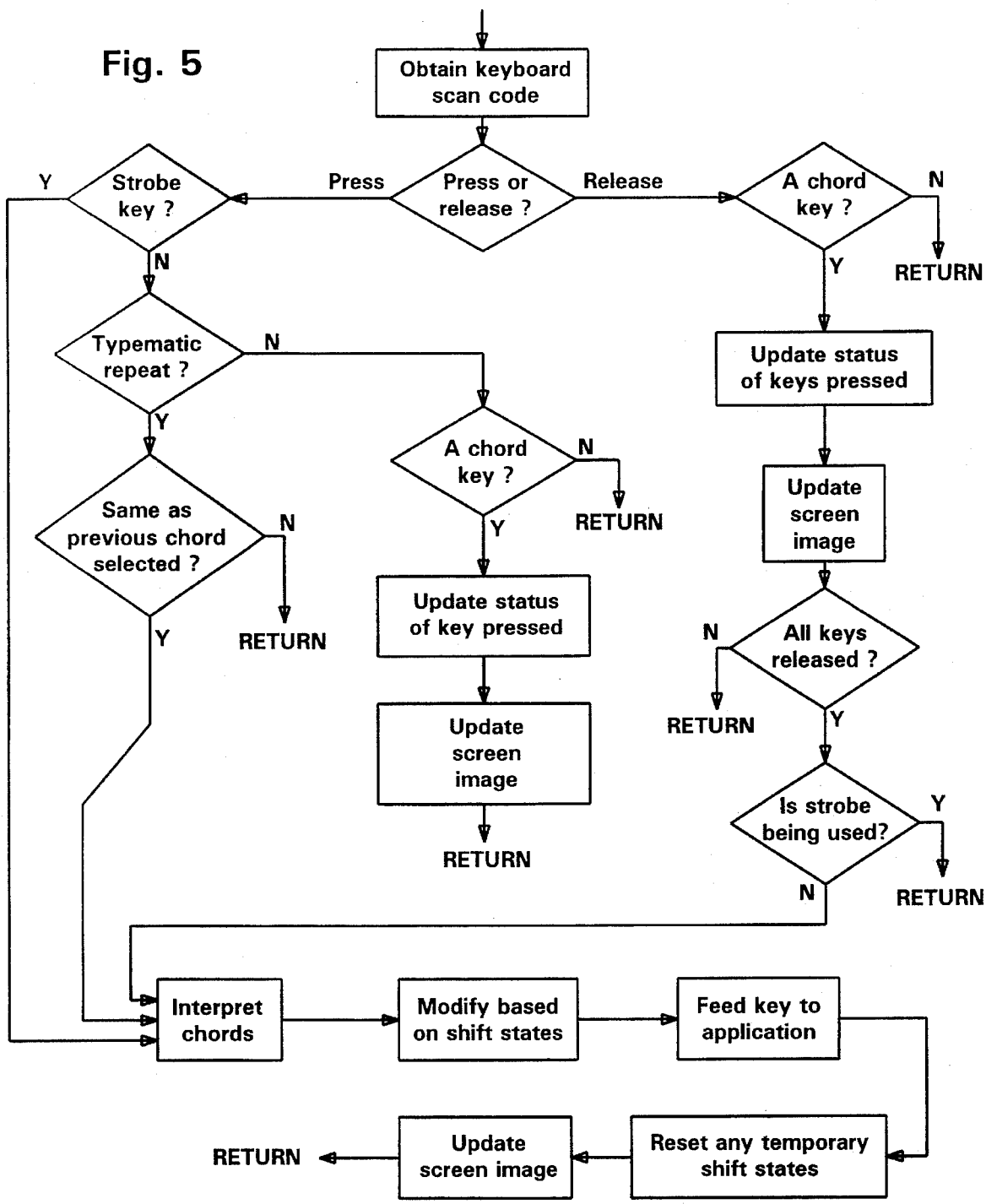
FIG. 5 is a block diagram illustrating important steps in the keyboard routine.

The important steps of the keyboard interrupt procedure are shown in the flowchart in FIG. 5. The computer code of course has much more detail. For example, each activation of the actual keyboard procedure indicates either a key-press or a key-release, as illustrated in the flowchart, or may also be the special "E0" prefix which occurs immediately prior to some key-presses and key-releases to indicate an alternate meaning of the immediately following "scan code" for the key-press or key-release, and handling of this E0 prefix is not shown in the flowchart. But this E0 prefix problem is a well-known complication, and one skilled in the art would not need to be informed about it and will not be surprised to see this handled in the computer code.

The keyboard routine required for implementation of the present invention will necessarily keep track of the following primary status information which may be updated as appropriate as a result of each keyboard event: 1: The state of each of the limited number of keys on the regular keyboard that are utilized for the chord keyboard input, whether each key is up or down. 2: The time (in "ticks" as previously defined) since each such key which is presently up last changed its state from down to up. Given this status information, the keyboard routine can interpret the meaning of each keyboard activity "scan code" it receives. This is the status information referred to in the flowchart.

It is interesting to note that the "typematic" feature, which would usually be implemented in the timer tick routine, is here implemented in the keyboard routine in a very novel and superior fashion. The keyboard's usual "typematic" behavior is very smooth, and even at a repeat rate of 30 characters per second, many users learn to release the key at just the right time in order end the line of repeated characters, or stop the cursor motion, at just the right spot. Resident software that provides key repetitions for "typematic" behavior usually uses the timer tick routine to do so, which is not as good since the timer tick information (18.2 ticks per second) does not allow smooth repetitions at 30 characters per second, instead requiring that 2 character be transmitted on most timer ticks, and one on the remaining timer ticks. Software-based "typematic" behavior is therefore harder to control for rapid repeat rates (although it is of course very smooth and easy to control at repeat rates of 18.2 per second, 9.1 per second, etc.). In this implementation, the software uses the "typematic" behavior of the last key pressed of the chord in order to provide the timing information for the chord's "typematic" behavior. The user gets the same range of available settings for the "typematic" delay time and repeat rate as the ordinary user, and gets the same smoothness of operation and ability to stop the repetitions when he desires.

Figure 6:
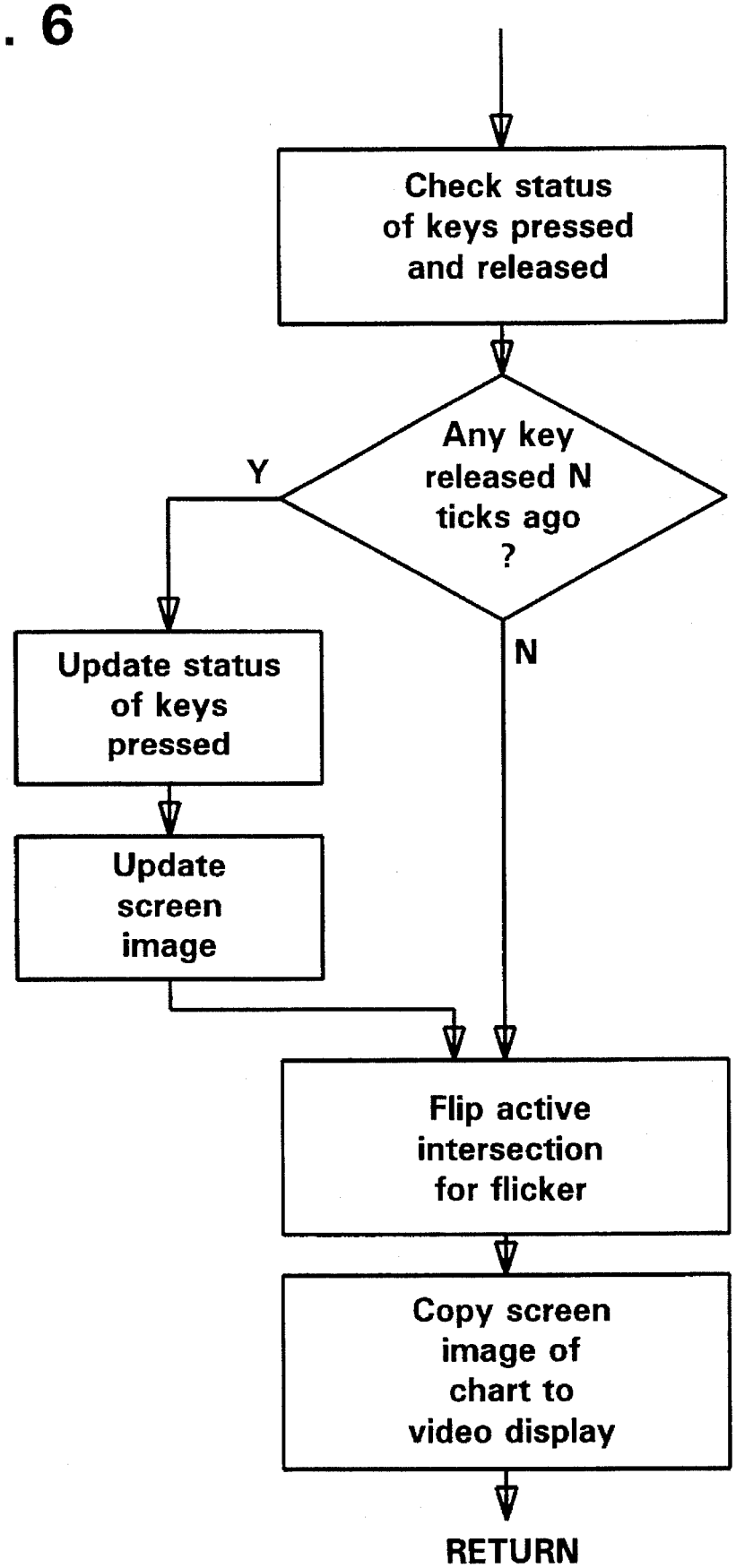
FIG. 6 is a block diagram illustrating important steps in the timer tick routine.

FIG. 6 shows the important steps of the timer tick interrupt procedure. This procedure rewrites the right-hand side of the video display on every timer tick in order to cover up any application program information which may have appeared in this area since the last timer tick, and controls the flickering of the highlighting of the character that would be input if the chord were released. This routine also handles the timing out of released keys, which provides the "rollover" capability that allows a user to correct chord errors before inputting the incorrect character to the application program.

ALTERNATE EMBODIMENT—TWO-HANDED VERSION

Figure 7:
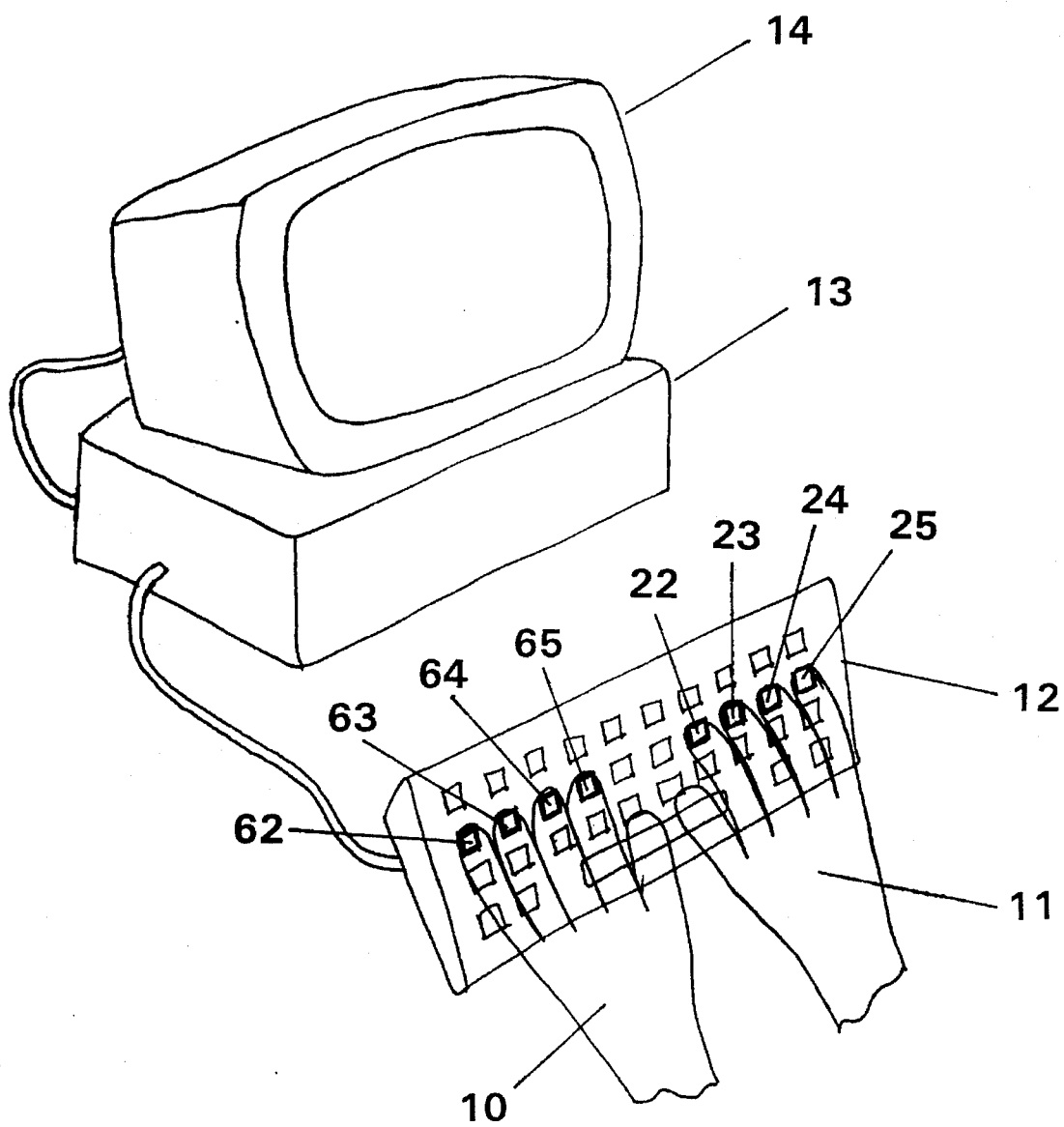
FIG. 7 illustrates a computer system with a user's hands operating the system using the two-handed alternative embodiment of the present invention.

An alternative embodiment of the present invention is a two-handed version, with four keys per hand, as shown in FIG. 7. In the right-handed implementation of this version, the selection of the row (group) is done with the left hand 10, and the character selection is done with the right hand 11. The left hand's fingers might be made to work as a conventional chord keyboard, where release of all keys within a predetermined time selects the active row corresponding to the chord which was pressed. But for this embodiment, the left hand's fingers 62 through 65 operate the four keys as if they were shift keys, the active row instantly changing as keys are pressed or released. The right hand's fingers 22 through 25 in either case operate in the same manner as the four fingers without the thumb for the preferred embodiment, that is as a conventional chord keyboard.

The two-handed version allows more rapid data entry than the one-handed version, since the right hand can continue to select characters, while the left hand accomplishes the row selection that had added to the right hand's workload in the one-handed version. But the two-handed version requires much greater number of dexterous fingers than the one-handed version, and even for able-bodied users there is a desire to have the second hand free for keeping place in reading material, turning pages, or whatever. Therefore, the two-handed version is not necessarily a preferred version.

The computer code which is provided herein implements this two-handed version as well as the preferred embodiment's one-handed version. To activate the two-handed version, simply press the F2 key immediately after loading the program code. The typists's home row finger keys are used, unless the user uses F3 to redefine the keys used. The general approach to this implementation is the same as for the preferred embodiment, and the differences in details are readily apparent in the computer code provided.

ALTERNATE EMBODIMENT—STROBE SWITCH

Some computer users have some difficulty manipulating the keyboard keys, and they are greatly helped by adaptive software products such as AccessDOS with its "SlowKeys" capability, for example. Other computer users have even greater difficulty manipulating the keyboard keys, and even with such adaptive software they cannot maintain sufficient data entry effectiveness, so they resort to other computer input methods, such as "single switch scanning". Many of these users, for example, have much better control over their breath than they do over their hands and fingers, as so they are provided with a "puff switch" which responds to their breath, and which is connected to a "single switch scanning" input system.

It is important to note that most computer users who have difficulty manipulating the keyboard keys have conditions which affect their motor skills but not their sensory input or their intelligence. They are quite aware of what actions they wish to take, and often they are quite aware of what actions they are taking, in spite of the fact that they are not able to take those actions as rapidly and in as controlled a fashion as an able-bodied person.

An alternative embodiment of the present invention makes use of the user's ability to control one switch very competently, and his awareness of what is happening, while recognizing that the user does not have the ability to manipulate the keyboard keys as well as an able-bodied user. This alternative embodiment is similar to the preferred embodiment described earlier, but the selection action (for a new active row or for a character in the row) is not taken upon release of all of the chord keys. The selection action is accomplished instead by a separate "strobe" switch, which is operated by some body part that the user is able to manipulate dexterously, and which would indicate the that the user had pressed all of the desired keys. For example, some users might wish to use their more dexterous hand with the one-handed version of this invention, but use the other hand to operate the strobe switch. For other users, the chord keys would also be operated by the fingers of one hand, but the strobe switch would be operated with a puff switch. Only those chord keys which are pressed at the time that the strobe switch is activated are considered in interpreting the chord indicating the character to be transmitted.

Figure 8:
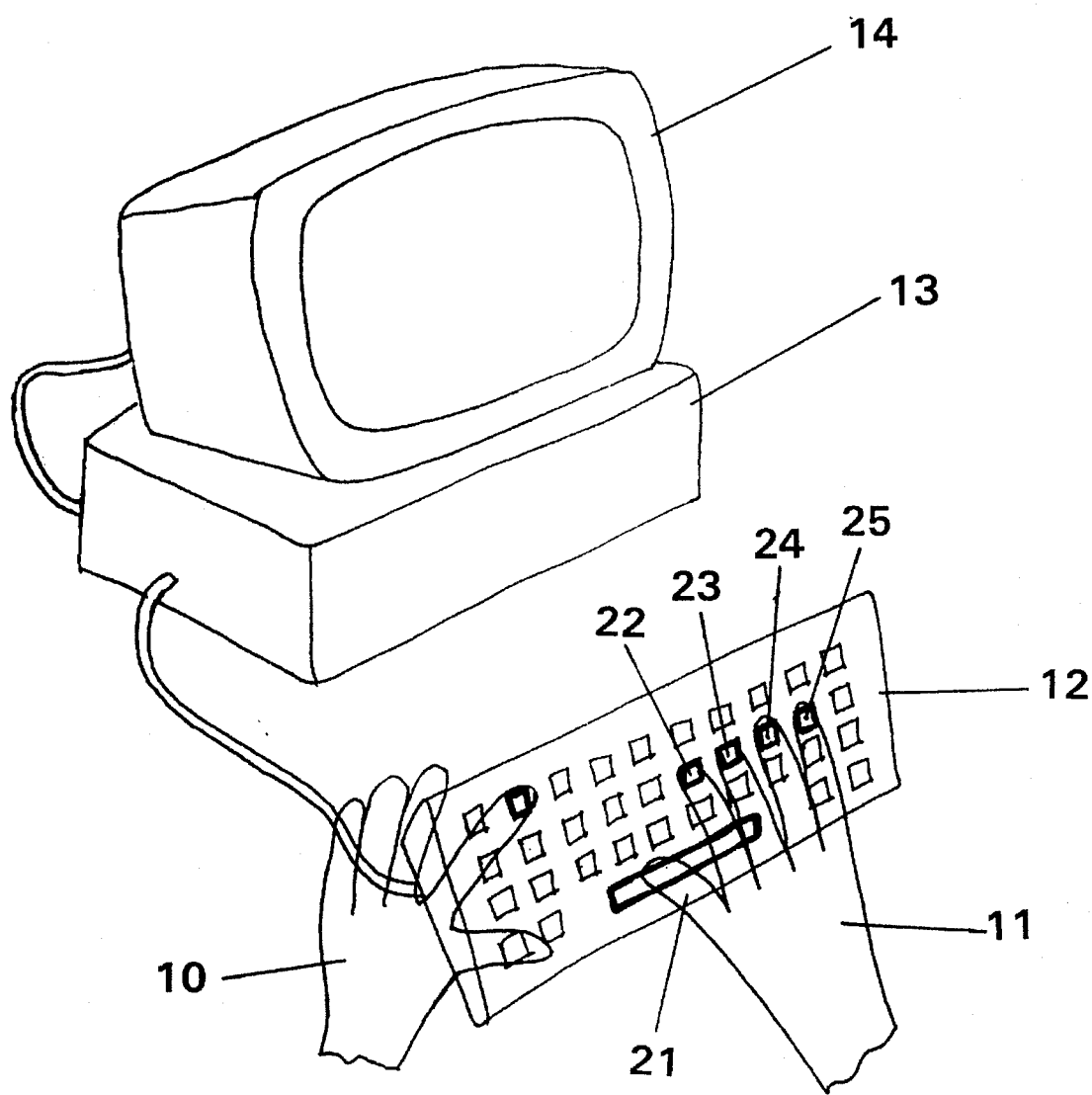
FIG. 8 illustrates a computer system with a user's hands operating the system using the alternative embodiment of the present invention wherein the user's right hand operates the chord keys, and the user's left hand operates the strobe switch.

The alternative embodiment of the present invention utilizing the right hand 11 in the same manner as the preferred embodiment, and utilizing the left hand 10 to operate the strobe switch, is illustrated in FIG. 8.

The strobe switch is especially valuable as an adjunct to the present invention because of the visual feedback provided to the user, the chart showing the active row and the selected character in that row. The user simply attempts to manipulate the keyboard keys so as to highlight the desired action, and when he sees that he has accomplished this, he activates the strobe switch. He can then proceed to manipulate the keyboard keys into the next desired chord. Any problems with control of the keyboard keys between activation of the strobe switch will not cause erroneous operation of the computer system.

This alternate embodiment of the present invention is implemented in the computer code provided. To activate this alternate embodiment, press F1 and then F4 immediately after loading the program code in order to operate the one-handed version. Or, press F2 and then F4 immediately after loading the program code in order to operate the two-handed version. The strobe switch is implemented as the "Q" key on the regular computer keyboard, which would be suitable for some users. Implementation with a puff switch, probably interfaced through a game port or serial port to the computer system, would be accomplished by the same process, with the necessary minor changes easily accomplished by one skilled in the art.

It is interesting to note that the concept of the strobe switch, introduced in the previous paragraph, although developed as an alternative embodiment of the present chord keyboard invention, is also applicable to conventional keyboards. An individual who has problems with control of his hands and fingers may find it difficult to operate a conventional keyboard without multiple presses of keys he intends to press only once, and extraneous presses of keys that he does not intend to press at that time. Such individuals may find that they can input characters to the computer with fewer errors, and therefore input characters faster since they do not have to take time for corrections, if they can utilize a strobe switch, perhaps implemented as a puff switch, to indicate when the keyboard should instantaneously accept data. This implementation would be especially valuable if the video display were to show the character that would be input by the user if he were to activate the strobe switch at any time (as is done for the present invention), so he could be sure he had the correct key pressed before strobing it in.

ALTERNATE EMBODIMENTS—OTHER KEYBOARD HARDWARE

The preferred embodiment has been presented with the use of five selected keys on a conventional computer keyboard device. This is a very suitable implementation of the present invention, since it does not require additional expense for specialized hardware, and it is available everywhere that one finds the IBM-PC-compatible DOS computers for which this implementation was done. Also, some persons with disabilities, even though they would find a specialized device more comfortable for them, prefer to use selected keys on a conventional keyboard since they feel there is some stigma involved with their requiring special adaptation of the computer, and there is less stigma if the special adaptation is hidden inside the computer as software and not clearly visible outside the computer as specialized hardware.

However, there is no question that conventional keyboard devices were not designed specifically for use as chord keyboards. The characteristics of the keys were designed for a user typing on the keyboard in the normal manner, and not using the keys as chord keyboard keys. Operation of a mouse button is more like operation of a chord keyboard key, so we would expect that the user would prefer to have keys more like mouse buttons, that is with much shorter travel and lighter touch. The conventional keyboard devices were also not designed well for use as chord keyboards as far as the locations of the keys are concerned. Even with the user having a choice of which keyboard keys to use for his five fingers, the positions of the keys he chooses on the keyboard are not likely to be as good as the positions of keys on a device made specifically for his hand shape.

A special keyboard device may therefore be provided, with keys appropriately positioned. This special device may have the keys in positions suitable for an "average" user and usable by many users. Or it may be a custom-made device with the keys positioned for the particular user, either for greater comfort, or because that particular user would not be able to use a device made for an "average" user. For two-handed systems, the two hands might be given a single device, or might be provided separate custom devices which is expected to be the best approach, or one hand might use a custom device while the other hand used selected keys on a conventional keyboard device, which would be the most economical solution for those users who were not able to reach the conventional keyboard with both hands because of their physical disability.

There are various ways of implementing custom devices in conjunction with the present invention. The custom devices themselves are very straightforwardly constructed, simply providing a requisite number of keys arranged in a suitable configuration. Short travel light touch (low force) switches are commercially available, as they are regularly used for mouse buttons. The "keycap" can easily be constructed, for example in a manner similar to that used for mouse buttons. Then there is a choice as to the method of interfacing to the computer system. The custom device might be interfaced through a serial port, in the same manner as many mouse interfaces are implemented, perhaps even using the standard mouse interface and mouse driver software in the computer system, modified only to increase the number of available mouse buttons. Alternatively, a conventional keyboard device may be modified by providing a suitable connector, wired into contact pads on the printed circuit board inside the keyboard, choosing contact pads which are also used by several ordinary keyboard keys. The "suitable connector" then becomes a "custom chord keyboard device port", and the custom device is plugged into it without the need for any interface electronics external to the computer system, as would be needed in order to interface the custom device as if it were a mouse.

The computer code provided implements this alternate embodiment of the present invention, for the case of the custom device being wired into a "custom chord keyboard device port" that has been provided on the conventional keyboard, since the software does not see any difference between custom device key-presses and conventional keyboard device key-presses in this case. Implementation with other sorts of interfaces, such as mouse-type interfaces, is also straightforward. The mouse-type signals of button presses and releases would alert the computer software in a different manner than regular keyboard key-presses and key-releases, but one skilled in the art of programming resident software would not find it difficult to modify the software accordingly. So for custom devices interfaced to the computer through a serial port like a mouse, or through other appropriate ports, the process would be the same as for the current implementation, with only minor details differing.

OTHER ALTERNATE EMBODIMENTS

There is yet another form of chord keyboard device which should be considered for use by some users, and that is commercially available devices such as "mice" that have keys that transmit signals to the computer when they are pressed and when they are released. For example, for a version of the present invention with only three keys for the right hand, an ordinary three-button mouse could be used. The mouse button presses and releases would signal the computer software in a different manner than regular keyboard key-presses and key-releases, but one skilled in the art of programming resident software would not find it difficult to modify the software accordingly. The primary advantage of this type of device is that it is readily available, and the device (unlike conventional keyboard devices) is very much designed to be operated in the manner of a handprint chord keyboard, in that the user is always resting three fingers on the three keys.

Both the one-handed and two-handed versions described above have been described for right-handed users. Of course left-handed alternative embodiments would be appropriate.

The video display of the entire chart, implemented for the preferred embodiment, may be reduced to a smaller display. The complete display was particularly intended for novice users, to give them substantial assistance in the operation of this type of chord keyboard. For a somewhat experienced user, a lesser degree of visual feedback will be appropriate. A smaller display with only the active row (group), rather than highlighting of the selected row among display of all rows, would intrude less on the normal display of the computer application, and would be quite adequate for the somewhat experienced user. For very experienced users, there need not be any visual feedback, and so no screen display would normally be necessary. However, the structuring of the chord encoding scheme so as to have the separation of the means for selecting a group, and the means for selecting a character within a group, and some of the other beneficial aspects of the present invention, would still be advantageous for the very experienced users.

The preferred embodiment of the present invention has been shown with a display of the groups and characters on the right-hand portion of the regular computer monitor, leaving the majority but not all of the regular computer monitor for the computer application that is being run with input through the present system. This is desired in many cases because the display of the groups and characters is easily viewed by the user who is also viewing the application displayed on the remainder of the video display, and because it does not require any additional computer hardware for its implementation. The use of the right-hand portion of the screen is often not a problem at all, for example simply requiring that margins be made narrower while using a word processor in order to have all of the text being edited appear to the left of the chart. However, for applications requiring the entire screen, various alternative embodiments are available:

A second monitor may be provided, with the computer application running on the primary monitor, and with the chart appearing on a secondary monitor. This is very easy to implement on some computer systems. For example, for an IBM-PC-compatible computer with the primary display being a color VGA monitor, an older-technology TTL monochrome monitor and adapter card can be installed in the same computer system.

Many adaptive software products, especially "single switch scanning" products, have a chart on the video display which is similar to the chart of the present invention. They do not always keep the chart permanently on the screen. They allow the application program to run with the chart removed from the screen, in order to prevent any interference between the adaptive software and the application program. They either display the chart when the application software indicates that it is waiting for keyboard input, or they display the chart when the user indicates by a key-press that he is ready to provide keyboard input. The chart may then be made to disappear from the screen in order to allow the application to be viewed, whenever desired, without any of the application program's video display having been changed by the adaptive software.

For computer systems with graphical user interfaces, such as Windows or the Macintosh interface, the operating system services will often allow the adaptive software's chart to appear on the screen at all times, unless removed at the request of the user, while the application program draws the screen "under" the adaptive software's display. Thus, unlike the IBM-PC-compatible DOS environment for which the implementation was provided here, the chart can always appear on the display, and yet the applications complete display can always be recovered without any effect of the adaptive software.

Functions of a "mouse" could be implemented as part of the present invention. In the same way that AccessDOS provides its "MouseKeys" functionality of the "mouse", operated through pressing computer keys, one skilled in the art would also be able to include "mouse" functions as part of the operation of the present invention. This would include motion of the mouse controlling the mouse cursor on the screen, and pressing and releasing the mouse buttons, including the ability to press a mouse button, accomplish mouse motion with the mouse button pressed, and then release the mouse button, this being the so-called "drag-and-drop" action.

Keyboard enhancers, as mentioned earlier, provide the user with very valuable capabilities such as a macro facility. As the present invention is in some sense a keyboard enhancer, it is appropriate that these valuable capabilities be included with the present invention as a single package.

Implementation would be straightforward for those skilled in the art.

Since this invention is primarily intended for use by disabled individuals, it is particularly important to consider how the present invention would be necessarily modified for some such individuals, keeping in mind the basic concepts and attributes of the present invention but implementing them in differing manners:

For blind and visually disabled users, there would not be a need or usefulness for a screen display of the available groups, but audible feedback would instead be appropriate. Pressing of a chord that would select a new active group might elicit a recital of the characters available in that group, each character being enunciated, which would be appropriate for a novice user. For a slightly more experienced user, this might be replaced by a rendition of some of the characters available in the group as a spoken nonsense-word, or as a word that described the group (such as "Numbers"), which would be sufficient for the slightly more experienced user to determine if the desired group had been properly selected. Admittedly, though, this would cheat the user of the greatest benefit of the present invention, which is the synergy of the organization of the chart, the organization of the chords, and the immediate meaningful feedback the user gets from the visual display of the chart with the current status of his actions shown so clearly.

The preferred embodiment has been described as a five-key one-handed keyboard. One alternative embodiment that has already been described is a two-handed version with four keys per hand. But many additional versions will be needed for disabled users who do not have five dexterous fingers on their primary hand, or who do not have four dexterous fingers on each of their two hands. For example, a user with only four dexterous fingers on one hand might simply utilize the preferred embodiment with his other hand operating the thumb key, or he might otherwise split up the workload between the hands (or other body parts) in a different manner without changing the overall design of the system. On the other hand, a user with only four fingers on one hand might desire to have a one-handed system as a convenience, in which case a four-key one-handed keyboard would be appropriate. He would simply make two chord selections for every character to be transmitted, regardless of whether that character was in the same group as the previous character or not. For each character to be transmitted, the first chord would indicate the group, and the second chord would indicate the character within the group. This is actually much closer to the organization of "single switch scanning", since that method also requires first a row (or group) selection and then a character selection. Note that the chord used to select the control row would have to be redefined for this alternative embodiment, since that previously used chord of no keys pressed does not work in this alternative embodiment, so another unused chord such as index and ring fingers (first and third of four fingers) would be used.

For users with less than four dexterous fingers, the present organization of the chart, with the present division of the characters into rows (groups) and the present subdivisions of the characters into subgroups of 4-3-2-1 and the present row grouping of 4-3-2-1, would not be appropriate. A new chart design would be needed, using many of the attributes of the present invention but adapting as necessary for the fewer number of fingers. For less than five fingers, and especially for less than four fingers, it would likely be worthwhile to give up the advantage of having only one key per finger, and so the user would have to be able to move at least one finger between two or more keys.

For users with very few dexterous fingers, and who cannot easily move their fingers between two or more keys per finger, the present invention may not suitable. A hybrid between "single switch scanning" and the present invention, using one to three keys, would likely provide an improvement over "single switch scanning", but would provide much slower input rates than the preferred embodiment of the present invention.

Some users might find it more convenient to select the active row (group) not with the keys at all, but with a lever (or other movable device) operated by any part of the user's body, the position of the lever controlling the choice of group activated. This lever might have a series of distinct positions, with resistance to motion of the lever between those distinct positions, each position corresponding to one of the groups to be chosen. Or, the operation of such a lever might be in place of only some of the keys, so that a combination of the lever and one or more keys would be utilized to select a group.

Various other functionality of AccessDOS and other adaptive software might also be appropriately combined with the present invention. For example, the AccessDOS SlowKeys capability of ignoring keys that are not held for at least a predetermined time period could be implemented along with the present invention, for those users who regularly briefly tapped keys unintentionally. This would be especially appropriate when combined with the strobe key alternate embodiment of the present invention as described above.

The previous examples of alternate embodiments of the present invention for disabled users will easily be recognized to be an incomplete but representative list. Tailoring of processes or products for disabled users often requires significant modification of the process or product, while at the same time maintaining the basic concepts and attributes of the process or product. Implementations of this invention will appear quite varied, even though they retain the essence of the present invention.

Therefore, for these and other reasons, although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

```
; Implementation of Computer Input System Implementing a
; Chord Keyboard with Structured Encoding and Visual Feedback
;
; To assemble and link this code, use Microsoft MASM version 5.1,
; and execute the commands
;           masm /T /Zi mm, exe\mm, exe\mm;
;           link /CO exe\mm, exe\mm, exe\mm;
;           exe2bin exe\mm mm.com
; This will generate the executable file mm.com in the present
; directory, with intermediate files in the exe subdirectory.

;
; To install, type "mm" at the DOS prompt.
; Then press F1 to activate 1-handed, or F2 to activate 2-handed.
; Do not use F1 or F2 again without uninstalling and reinstalling.
; Press F3 to define new keys, then press them L to R.
; Press F4 to set strobe mode on.
; Press ESC to de-activate.
; To uninstall, type "mm /u" at the DOS prompt.
;
; Some portions of this code are from PC Magazine "Encore"
; program, from issue of April 16, 1991.  That code is Copyright
; 1991 by Ziff-Davis Publishing Company.  That code also has the
; notice that "portions of this code are copyrighted 1990 by RSE
; Incorporated and used with permission".  Portions of this code
; are used here with permission, according to their statement:
; "You may make copies for others as long as no charge is
; involved.  However, making copies for any commercial purpose
; is prohibited."
;

Code            segment byte public 'code'
                assume cs:code
                assume ds:code org 100h
LGo: jmp Init Act?            db      0       ;Activate flag
        tick            dw      0       ;keeps track of clock in sound proc
        Release?        db      0       ;0 = key press, 1 = key release
        Message         db      'CkCkCkHere'
        Vec9            dd      0       ;Int 9 original vector
        Vec1C           dd      0       ;Int 1C original vector Shifted?        db      0
        Capled?         db      0
        Ctrled?         db      0
        Alted?          db      0
        Functed?        db      0

SpecialTable    dw      0,SpCaps,SpShift,SpCtrl,SpAlt,SpFunct
```

```
            KPressed     dw      0                       ;whether each key is pressed
            WPressed     dw      0                       ;whether each key was pressed
            LPressed     dw      0                       ;last selected WPressed
            NKScans      dw      8
            ;Define KScans left to right
            KScans       db      1Eh,1Fh,20h,21h,24h,25h,26h,27h
            TimeUp       db      9
            FlickCount   db      0
            KTimes       db      0,0,0,0,0,0,0,0
            LiftMask     dw      0Fh                     ;R group
            ModeMask     dw      03F0h                   ;L group
            NRight       db      4
            SaveGroup    db      0
            DoingDefKey  db      0
            OffsetDefKey dw      0
            E0Prefix     db      0
            ScanSave     db      0
            ActiveGroup  db      0
            ActiveItem   db      0
            ActiveCol    dw      0ffffh
            ActiveRow    dw      0ffffh
            SaveFull     dw      0
            GroupLine    db      16,5,4,9,3,0ffh,8,12,2,0ffh,0ffh,0ffh,7,0ffh,11,14
            ItemCol      db      0ffh,8,7,12,6,0ffh,11,15,5,0ffh,0ffh,0ffh
                         db      10,0ffh,14,17
            LineLength2  db      40
            Strobe?      db      0
            LCKP         db      0

;Group 0
            Codes        dw      0000h,0ff04h,0ff03h,0000h
                         dw      0ff02h,0000h,0000h,0000h
                         dw      0ff01h,0000h,0000h,0000h
                         dw      0000h,0000h,0000h,0ff05h
                         ;Group 1
                         dw      0000h,0534h,0433h,0837h
                         dw      0332h,0000h,0736h,0a39h
                         dw      0231h,0000h,0000h,0000h
                         dw      0635h,0000h,0938h,0b30h
                         ;Group 2
                         dw      0000h,1051h,254bh,2d58h
                         dw      244ah,0000h,1157h,342eh
                         dw      2247h,0ff01h,0000h,0000h
                         dw      2f56h,0000h,2c5ah,1c0dh
                         ;Group 3
                         dw      0000h,2b7ch,2827h,0826h
                         dw      273ah,0000h,0c5fh,1b5dh
                         dw      342eh,0000h,0000h,0000h
                         dw      0340h,0000h,1a5bh,0f09h
                         ;Group 4
                         dw      0000h,2146h,2044h,1950h
                         dw      2e43h,0000h,324dh,1559h
                         dw      3042h,0ff01h,0000h,0000h
```

```
        dw      264ch,0000h,1655h,0e08h
;Group 5
        dw      0000h,0000h,0000h,0000h
        dw      0000h,0000h,0000h,0000h
        dw      0000h,0000h,0000h,0000h
        dw      0000h,0000h,0000h,0000h
;Group 6
        dw      0000h,2b5ch,2822h,0625h
        dw      273bh,0000h,0221h,1b7dh
        dw      332ch,0000h,0000h,0000h
        dw      353fh,0000h,1a7bh,0f00h
;Group 7
        dw      0000h,4de0h,50e0h,47e0h
        dw      48e0h,0000h,51e0h,53e0h
        dw      4be0h,0000h,0000h,0000h
        dw      49e0h,0000h,52e0h,4fe0h
;Group 8
        dw      0000h,184fh,1749h,1f53h
        dw      1245h,0000h,1352h,2348h
        dw      1e41h,0ff01h,0000h,0000h
        dw      314eh,0000h,1454h,3920h
;Group 9
        dw      0000h,0000h,0000h,0000h
        dw      0000h,0000h,0000h,0000h
        dw      0000h,0000h,0000h,0000h
        dw      0000h,0000h,0000h,0000h
;Group a
        dw      0000h,0000h,0000h,0000h
        dw      0000h,0000h,0000h,0000h
        dw      0000h,0000h,0000h,0000h
        dw      0000h,0000h,0000h,0000h
;Group b
        dw      0000h,0000h,0000h,0000h
        dw      0000h,0000h,0000h,0000h
        dw      0000h,0000h,0000h,0000h
        dw      0000h,0000h,0000h,0000h
;Group c
        dw      0000h,352fh,092ah,0524h
        dw      0c2dh,0000h,0423h,0b29h
        dw      0d2bh,0000h,0000h,0000h
        dw      0d3dh,0000h,0a28h,011bh
;Group d
        dw      0000h,0000h,0000h,0000h
        dw      0000h,0000h,0000h,0000h
        dw      0000h,0000h,0000h,0000h
        dw      0000h,0000h,0000h,0000h
;Group e
        dw      0000h,0000h,0000h,0000h
        dw      0000h,0000h,0000h,343eh
        dw      0000h,0000h,0000h,0000h
        dw      0000h,0000h,333ch,0000h
;Group f
        dw      0000h,0000h,0000h,2960h
```

```
              dw       0000h,0000h,297eh,0000h
              dw       0000h,0000h,0000h,0000h
              dw       075eh,0000h,0000h,0000h

Z             equ      07h          ;attribute for normal text
ZZ            equ      70h          ;attribute for reverse text
Y             equ      20h          ;character between grouped chars
YY            equ      07h          ;character to fill empty place in chart
              ;Line 1
ScreenImage   db       ' ',Z,' ',Z,' ',Z,' ',Z
              db       ' ',Z,' ',Z,' ',Z,' ',Z
              db       ' ',Z,' ',Z,' ',Z,' ',Z
              db       ' ',Z,' ',Z,' ',Z,' ',Z
              db       ' ',Z,' ',Z,' ',Z,' ',Z
              ;Line 2
              db       ' ',Z,' ',Z,' ',Z,' ',Z
              db       'a',Z,'e',Z,'i',Z,'o',Z,Y,Z
              db       'n',Z,'r',Z,'s',Z,Y,Z
              db       't',Z,'h',Z,Y,Z,0afh,Z
              db       ' ',Z,' ',Z,' ',Z
              ;Line 3
              db       ' ',Z,' ',Z,' ',Z,' ',Z
              db       'b',Z,'c',Z,'d',Z,'f',Z,Y,Z
              db       'l',Z,'m',Z,'p',Z,Y,Z
              db       'u',Z,'y',Z,Y,Z,0aeh,Z
              db       ' ',Z,' ',Z,' ',Z
              ;Line 4
              db       ' ',Z,' ',Z,' ',Z,' ',Z
              db       'g',Z,'j',Z,'k',Z,'q',Z,Y,Z
              db       'v',Z,'w',Z,'x',Z,Y,Z
              db       'z',Z,'.',Z,Y,Z,011h,Z
              db       ' ',Z,' ',Z,' ',Z
              ;Line 5
              db       ' ',Z,' ',Z,' ',Z,' ',Z
              db       '1',Z,'2',Z,'3',Z,'4',Z,Y,Z
              db       '5',Z,'6',Z,'7',Z,Y,Z
              db       '8',Z,'9',Z,Y,Z,'0',Z
              db       ' ',Z,' ',Z,' ',Z
              ;Line 6
              db       ' ',Z,' ',Z,' ',Z,' ',Z
              db       Y,Z,Y,Z,Y,Z,Y,Z,' ',Z
              db       Y,Z,Y,Z,Y,Z,' ',Z
              db       Y,Z,Y,Z,' ',Z,Y,Z,' ',Z,' ',Z,' ',Z
              ;Line 7
              db       ' ',Z,' ',Z,' ',Z,' ',Z
              db       '+',Z,'-',Z,'*',Z,'/',Z,Y,Z
              db       '=',Z,'#',Z,'$',Z,Y,Z
              db       '(',Z,')',Z,Y,Z,00fh,Z
              db       ' ',Z,' ',Z,' ',Z
              ;Line 8
              db       ' ',Z,' ',Z,' ',Z,' ',Z
              db       ',',Z,';',Z,'"',Z,'\',Z,Y,Z
              db       '?',Z,'!',Z,'%',Z,Y,Z
```

```
db      '{',Z,'}',Z,Y,Z,0a9H,Z
db      ' ',Z,' ',Z,' ',Z
;Line 9
db      ' ',Z,' ',Z,' ',Z,' ',Z
db      '.',Z,':',Z,27h,Z,'|',Z,Y,Z
db      '@',Z,'_',Z,'&',Z,Y,Z
db      '[',Z,']',Z,Y,Z,0aaH,Z
db      ' ',Z,' ',Z,' ',Z
;Line 10
db      ' ',Z,' ',Z,' ',Z,' ',Z
db      Y,Z,Y,Z,Y,Z,Y,Z,' ',Z
db      Y,Z,Y,Z,Y,Z,' ',Z
db      Y,Z,Y,Z,' ',Z,Y,Z,' ',Z,' ',Z,' ',Z
;Line 11
db      ' ',Z,' ',Z,' ',Z,' ',Z
db      YY,Z,YY,Z,YY,Z,YY,Z,Y,Z
db      YY,Z,YY,Z,YY,Z,Y,Z
db      '<',Z,'>',Z,Y,Z,YY,Z
db      ' ',Z,' ',Z,' ',Z
;Line 12
db      ' ',Z,' ',Z,' ',Z,' ',Z
db      1bh,Z,18h,Z,19h,Z,1ah,Z,Y,Z
db      1eh,Z,1fh,Z,04h,Z,Y,Z
db      'I',Z,'D',Z,Y,Z,'E',Z
db      ' ',Z,' ',Z,' ',Z
;Line 13
db      ' ',Z,' ',Z,' ',Z,' ',Z
db      Y,Z,Y,Z,Y,Z,Y,Z,' ',Z
db      Y,Z,Y,Z,Y,Z,' ',Z
db      Y,Z,Y,Z,' ',Z,Y,Z,' ',Z,' ',Z,' ',Z
;Line 14
db      ' ',Z,' ',Z,' ',Z,' ',Z
db      YY,Z,YY,Z,YY,Z,YY,Z,Y,Z
db      '^',Z,'~',Z,'`',Z,Y,Z
db      YY,Z,YY,Z,Y,Z,YY,Z
db      ' ',Z,' ',Z,' ',Z
;Line 15
db      ' ',Z,' ',Z,' ',Z,' ',Z
db      Y,Z,Y,Z,Y,Z,Y,Z,' ',Z
db      Y,Z,Y,Z,Y,Z,' ',Z
db      Y,Z,Y,Z,' ',Z,Y,Z,' ',Z,' ',Z,' ',Z
;Line 16
db      ' ',Z,' ',Z,' ',Z,' ',Z
db      'C',Z,'S',Z,'c',Z,'A',Z,Y,Z
db      YY,Z,YY,Z,YY,Z,Y,Z
db      YY,Z,YY,Z,Y,Z,'F',Z
db      ' ',Z,' ',Z,' ',Z
;Line 17
db      ' ',Z,' ',Z,' ',Z,' ',Z
db      'a',Z,'h',Z,'t',Z,'l',Z,Y,Z
db      ' ',Z,' ',Z,' ',Z,Y,Z
db      ' ',Z,' ',Z,Y,Z,'u',Z
db      ' ',Z,' ',Z,' ',Z
```

```
            ;Line 18
            db      ' ',Z,' ',Z,' ',Z,' ',Z
            db      'p',Z,'f',Z,'r',Z,'t',Z,Y,Z
            db      ' ',Z,' ',Z,' ',Z,Y,Z
            db      ' ',Z,' ',Z,Y,Z,'n',Z
            db      ' ',Z,' ',Z,' ',Z
            ;Line 19
            db      ' ',Z,' ',Z,' ',Z,' ',Z
            db      's',Z,'t',Z,'l',Z,' ',Z,Y,Z
            db      ' ',Z,' ',Z,' ',Z,Y,Z
            db      ' ',Z,' ',Z,Y,Z,'c',Z
            db      ' ',Z,' ',Z,' ',Z
            ;Line 20
            db      ' ',Z,' ',Z,' ',Z,' ',Z
            db      ' ',Z,' ',Z,' ',Z,' ',Z
            db      ' ',Z,' ',Z,' ',Z,' ',Z
            db      ' ',Z,' ',Z,' ',Z,' ',Z
            db      ' ',Z,' ',Z,' ',Z,' ',Z
            ;Line 21
            db      ' ',Z,'M',Z,'I',Z,'N',Z
            db      'I',Z,'M',Z,'A',Z,'L',Z
            db      ' ',Z,'M',Z,'O',Z,'T',Z
            db      'I',Z,'O',Z,'N',Z,' ',Z
            db      '(',Z,'t',Z,'m',Z,')',Z
            ;Line 22
            db      ' ',Z,'C',Z,'o',Z,'p',Z
            db      'y',Z,'r',Z,'i',Z,'g',Z
            db      'h',Z,'t',Z,' ',Z,'(',Z
            db      'c',Z,')',Z,' ',Z,'1',Z
            db      '9',Z,'9',Z,'3',Z,' ',Z
            ;Line 23
            db      ' ',Z,'E',Z,'q',Z,'u',Z
            db      'a',Z,'l',Z,' ',Z,'A',Z
            db      'c',Z,'c',Z,'e',Z,'s',Z
            db      's',Z,' ',Z,'C',Z,'o',Z
            db      'm',Z,'p',Z,'u',Z,'-',Z
            ;Line 24
            db      ' ',Z,'t',Z,'e',Z,'r',Z
            db      ' ',Z,'T',Z,'e',Z,'c',Z
            db      'h',Z,'n',Z,'o',Z,'l',Z
            db      'o',Z,'g',Z,'y',Z,',',Z
            db      ' ',Z,'I',Z,'n',Z,'c',Z
            ;Line 25
            db      ' ',Z,' ',Z,' ',Z,' ',Z
            db      ' ',Z,' ',Z,' ',Z,' ',Z
            db      ' ',Z,' ',Z,' ',Z,' ',Z
            db      ' ',Z,' ',Z,' ',Z,' ',Z
            db      ' ',Z,' ',Z,' ',Z,' ',Z I9          proc
;activated anytime a key is pressed OR released
            sti
            push    ax
```

```
                in      al,60h              ;get scan code of key press
;Check for E0 prefix
                cmp     al,0e0h
                jne     NotE0Prefix
                cmp     cs:Act?,0
                jne     IsAct
                jmp     Normal9
IsAct:
                mov     cs:E0Prefix,1
                jmp     Abort9
NotE0Prefix:

;Save unmodified scan code, press or release
                mov     cs:ScanSave,al push    ax
                and     al,80h              ;check whether a key release
                mov     cs:Release?,al
                pop     ax ;If a release, strip off the high bit leaving only the stripped code
                and     al,7fh ;If prefixed by E0, add 80h to stripped code
                cmp     cs:E0Prefix,0
                je      NoAdd80
                or      al,80h
                mov     cs:E0Prefix,0
NoAdd80:

cmp     cs:Release?,0
                je      PressNotRelease
                jmp     IsRelease PressNotRelease:
                cmp     al,3bh              ;Activate1 hot key scan code?
                jne     NotAct1
                jmp     ActKey1?
NotAct1:
                cmp     al,3ch              ;Activate2 hot key scan code?
                jne     NotAct2
                jmp     ActKey2?
NotAct2:
                cmp     al,3dh              ;Define keys hot key scan code?
                jne     NotDefKey
                jmp     DefKey?
NotDefKey:
                cmp     al,3eh              ;F4 = Strobe setting key?
                jne     NotStrosKey
                mov     cs:Strobe?,1
                call    I9end
                pop     ax
```

```
                iret
NotStrosKey:
                cmp     al,10h              ;Q = Strobe key?
                jne     NotStroKey
                push    cx
                push    es
                push    di
                mov     ax,cs:WPressed      ;Get all that were pressed
                jmp     StrobeIt
NotStroKey:

;Is this a re-press of the last chord key pressed?
                push    ax
                cmp     al,cs:LCKP
                jne     NotLCKP
                cmp     cs:ActiveGroup,0
                je      NotLCKP
                mov     ax,cs:LPressed      ;Get all that were pressed
                cmp     ax,cs:WPressed
                jne     NotLCKP
                pop     ax
                mov     ax,cs:LPressed      ;Get all that were pressed
                push    cx
                push    es
                push    di
                jmp     StrobeIt
NotLCKP:
                pop     ax cmp     al,01h              ;Deactivate hot key scan code?
                jne     I94
                jmp     Deactivate?

I94:
                cmp     cs:Act?,1           ;if activated then do specials
                je      YesSpecial
                mov     al,cs:ScanSave
                jmp     Normal9             ; otherwise proceed with normal YesSpecial:
;Check DoingDefKey to see if KScans is being set up
                cmp     cs:DoingDefKey,0
                je      NotDoingDefKey
                push    cx
                push    di
                mov     cx,cs:OffsetDefKey
                mov     di,cx
                mov     cs:KScans[di],al
                inc     cx
                cmp     cx,cs:NKScans
                jb      ContinueDefKey
                mov     cs:DoingDefKey,0
                call    sound
```

```
                call    sound
                call    sound
                jmp     DefKeyDone
ContinueDefKey:
                mov     cs:OffsetDefKey,cx
DefKeyDone:
                pop     di
                pop     cx
                jmp     Abort9

NotDoingDefKey:

push    cx
                push    es
                push    di cld
                mov     cx,cs:NKScans       ;Set up for compares
                push    cs
                pop     es
                mov     di,offset KScans    ;es:di points at KScans
                repne scasb                 ;cx is NKScans-1 thru 0
                jne     GoAbort9            ;means not found
                mov     ax,1
                shl     ax,cl               ;ax has bit in place for this key
                cmp     cl,3
                ja      NotPress4
                push    bx
                mov     bx,cs:NKScans
                dec     bx
                sub     bx,cx
                mov     bl,cs:KScans[bx]
                mov     cs:LCKP,bl
                pop     bx
NotPress4:
                cmp     cs:NRight,4
                jne     NotPress2g
                cmp     cl,3
                jbe     NotPress2g
                mov     cs:LPressed,0
NotPress2g:
                pushf
                cli
                or      cs:KPressed,ax      ;Update KPressed
                or      cs:WPressed,ax      ;Update WPressed
                call    ShowBits
                popf
                call    UpGroupItem GoAbort9:       pop     di
                pop     es
                pop     cx
                jmp     Abort9
```

```
IsRelease:
            mov     cs:LCKP,0
            cmp     cs:Act?,1       ;if activated then do specials
            je      YesRelease
            mov     al,cs:ScanSave
            jmp     Normal9         ; otherwise proceed with normal YesRelease:
            push    cx
            push    es
            push    di cld
            mov     cx,cs:NKScans   ;Set up for compares
            push    cs
            pop     es
            mov     di,offset KScans   ;es:di points at KScans
            repne   scasb           ;cx is NKScans-1 thru 0
            jne     GoAbort9        ;means not found
            mov     ax,1
            shl     ax,cl           ;ax has bit in place for this key
            not     ax              ;Now ax has this bit off, else on
            cmp     cl,cs:NRight       ;Update WPressed if L group
            jb      IsRight
            pushf
            cli
            and     cs:KPressed,ax  ;Update KPressed
            and     cs:WPressed,ax  ;Update WPressed
            call    ShowBits
            popf
            call    UpGroupItem
            jmp     GoAbort9A       ;Lift up on mode bit is not a code IsRight:
            push    di
            push    ax
            pushf
            cli
            and     cs:KPressed,ax  ;Update KPressed
            call    ShowBits
            mov     di,cx
            neg     di
            add     di,cs:NKScans
            dec     di
            mov     al,cs:Timeup
            mov     cs:KTimes[di],al
            popf
            pop     ax
            pop     di
            mov     ax,cs:KPressed
            and     ax,cs:LiftMask  ;Test only R group of bits
            jz      NoGo9y
            jmp     GoAbort9A
```

```
NoGo9y:
            cmp     cs:NRight,4
            je      No1
            call    UpGroupItem
No1:
            pushf
            cli
            mov     ax,cs:WPressed      ;Get all that were pressed
            mov     cx,cs:ModeMask
            and     cs:WPressed,cx      ;and reset R group
            call    ClearTimes
            popf
            cmp     cs:NRight,4
            jne     Yes1
            call    UpGroupItem
Yes1:

;Keys fully released, so we have a code to interpret,
;unless Strobe is set
            cmp     cs:Strobe?,0
            je      NoGo9q
            call    UpGroupItem
            jmp     GoAbort9A
NoGo9q:

;And come in here with strobe key itself
StrobeIt:

;For 1-handed version, check for group provided, or mix in active
group
            mov     cs:LPressed,ax
            cmp     cs:NRight,4
            je      Not1Handed
            mov     cx,ax
            and     cx,0F0h
            je      NotGroup1Handed
            mov     cs:LPressed,0
            shl     al,1
            shl     al,1
            shl     al,1
            shl     al,1
            mov     cs:SaveGroup,al
            jmp     GoAbort9A
NotGroup1Handed:
            or      al,cs:SaveGroup
            call    UpGroupItem
Not1Handed:

;Save the 8-bit representation in SaveFull
            mov     cs:SaveFull,ax mov     cx,ax               ;cx now has the 8-bit representation
```

```
                shl     cx,1            ;and double it to get the offset
                mov     di,cx
                mov     ax,cs:Codes[di]
                cmp     ax,0
                jne     NoGo9x
                jmp     GoAbort9A       ;means not found
NoGo9x:

;Check for specials
                cmp     ah,0ffh
                je      IsSpecial
                jmp     NotSpecial
IsSpecial:
                mov     ah,0
                shl     ax,1
                mov     di,ax
                jmp     cs:SpecialTable[di]
OutOfSpecial:
                jmp     GoAbort9A
NotSpecial:

; If this is an alphabetic char, make upper or lower case
                cmp     al,41h
                jb      NotAlphabetic
                cmp     al,5ah
                ja      NotAlphabetic
                push    cx
                mov     cl,0
                cmp     cs:Shifted?,0
                je      NotShifted
                not     cl
NotShifted:
                cmp     cs:Capled?,0
                je      NotCapled
                not     cl
NotCapled:
                cmp     cl,0
                jne     IsUpper
                add     al,20h
IsUpper:
                pop     cx
NotAlphabetic:

; If this is a function key, convert codes properly,
; and consider effect of Alt, Ctrl, Shift
                cmp     cs:Functed?,0
                je      NotFunction
                cmp     ah,02h
                jb      NotFunction110
                cmp     ah,0bh
                ja      NotFunction110
                jmp     IsFunction110
NotFunction110:
```

```
                cmp     ah,0ch
                je      IsFunction12
                cmp     ah,0dh
                je      IsFunction11
                jmp     NotFunction
IsFunction11:
                mov     ax,5700h
                jmp     IsFunction1112
IsFunction12:
                mov     ax,5800h
IsFunction1112:
                cmp     cs:Alted?,0
                je      NotAltedF1112
                add     ah,06h
                jmp     FunctionDone
NotAltedF1112:
                cmp     cs:Ctrled?,0
                je      NotCtrledF1112
                add     ah,04h
                jmp     FunctionDone
NotCtrledF1112:
                cmp     cs:Shifted?,0
                je      NotShiftedF1112
                add     ah,02h
                jmp     FunctionDone
NotShiftedF1112:
                jmp     FunctionDone
IsFunction110:
                mov     al,0
                add     ah,39h
                cmp     cs:Alted?,0
                je      NotAltedF110
                add     ah,2dh
                jmp     FunctionDone
NotAltedF110:
                cmp     cs:Ctrled?,0
                je      NotCtrledF110
                add     ah,23h
                jmp     FunctionDone
NotCtrledF110:
                cmp     cs:Shifted?,0
                je      NotShiftedF110
                add     ah,19h
                jmp     FunctionDone
NotShiftedF110:
FunctionDone:
NotFunction:

;Reset any shift states that were only set to level 1
                cmp     cs:Capled?,1
                jne     NoCapled1
                mov     cs:Capled?,0
                call    UpperLower
```

```
                mov     cs:ScreenImage[768],0
NoCapled1:
                cmp     cs:Shifted?,1
                jne     NoShifted1
                mov     cs:Shifted?,0
                call    UpperLower
                mov     cs:ScreenImage[770],0
NoShifted1:
                cmp     cs:Ctrled?,1
                jne     NoCtrled1
                mov     cs:Ctrled?,0
                mov     cs:ScreenImage[772],0
NoCtrled1:
                cmp     cs:Alted?,1
                jne     NoAlted1
                mov     cs:Alted?,0
                mov     cs:ScreenImage[774],0
NoAlted1:
                cmp     cs:Functed?,1
                jne     NoFuncted1
                mov     cs:Functed?,0
                mov     cs:ScreenImage[792],0
NoFuncted1:

Call    PutChar

GoAbort9A:      pop     di
                pop     es
                pop     cx
                jmp     Abort9

Abort9:
                call    I9end
                pop     ax
                iret ;
; Special Handlers go here
;

;Caps Handler
SpCaps:
                cmp     cs:Capled?,0
                jne     SpCaps1
                mov     cs:Capled?,1
                call    UpperLower
                mov     cs:ScreenImage[768],1
                jmp     OutOfSpecial
SpCaps1:
                cmp     cs:Capled?,1
                jne     SpCaps2
                mov     cs:Capled?,2
                mov     cs:ScreenImage[768],2
```

```
                jmp     OutOfSpecial
SpCaps2:
                mov     cs:Capled?,0
                call    UpperLower
                mov     cs:ScreenImage[768],0
                jmp     OutOfSpecial ;Shift Handler
SpShift:
                cmp     cs:Shifted?,0
                jne     SpShift1
                mov     cs:Shifted?,1
                call    UpperLower
                mov     cs:ScreenImage[770],1
                jmp     OutOfSpecial
SpShift1:
                cmp     cs:Shifted?,1
                jne     SpShift2
                mov     cs:Shifted?,2
                mov     cs:ScreenImage[770],2
                jmp     OutOfSpecial
SpShift2:
                mov     cs:Shifted?,0
                call    UpperLower
                mov     cs:ScreenImage[770],0
                jmp     OutOfSpecial ;Ctrl Handler
SpCtrl:
                cmp     cs:Ctrled?,0
                jne     SpCtrl1
                mov     cs:Ctrled?,1
                mov     cs:ScreenImage[772],1
                jmp     OutOfSpecial
SpCtrl1:
                cmp     cs:Ctrled?,1
                jne     SpCtrl2
                mov     cs:Ctrled?,2
                mov     cs:ScreenImage[772],2
                jmp     OutOfSpecial
SpCtrl2:
                mov     cs:Ctrled?,0
                mov     cs:ScreenImage[772],0
                jmp     OutOfSpecial ;Alt Handler
SpAlt:
                cmp     cs:Alted?,0
                jne     SpAlt1
                mov     cs:Alted?,1
                mov     cs:ScreenImage[774],1
                jmp     OutOfSpecial
SpAlt1:
```

```
                cmp     cs:Alted?,1
                jne     SpAlt2
                mov     cs:Alted?,2
                mov     cs:ScreenImage[774],2
                jmp     OutOfSpecial
SpAlt2:
                mov     cs:Alted?,0
                mov     cs:ScreenImage[774],0
                jmp     OutOfSpecial ;Funct Handler
SpFunct:
                cmp     cs:Functed?,0
                jne     SpFunct1
                mov     cs:Functed?,1
                mov     cs:ScreenImage[792],1
                jmp     OutOfSpecial
SpFunct1:
                cmp     cs:Functed?,1
                jne     SpFunct2
                mov     cs:Functed?,2
                mov     cs:ScreenImage[792],2
                jmp     OutOfSpecial
SpFunct2:
                mov     cs:Functed?,0
                mov     cs:ScreenImage[792],0
                jmp     OutOfSpecial Normal9:
I95:            cli
                pushf
                call    cs:Vec9             ;call original interrupt I96:            pop     ax
                iret Deactivate?:
                call    EndAct R20:            call    I9end
                pop     ax
                iret ;DefKey hot key
DefKey?:
                call    sound
                call    sound
                call    sound
                mov     cs:DoingDefKey,1
                mov     cs:OffsetDefKey,0
                cmp     cs:NRight,4
                je      ActKey2?
```

```
;Activate hot key
ActKey1?:
            pushf
            cli
            cmp         cs:Act?,0
            je          NoOldIG
            call        OldIG
NoOldIG:
            mov         cs:Act?,0
            popf
            call        sound
            mov         cs:NKScans,5
            mov         cs:NRight,5
            mov         cs:LiftMask,1fh
            mov         cs:ModeMask,0h
            mov         cs:KScans[0],39h
            mov         cs:KScans[1],24h
            mov         cs:KScans[2],25h
            mov         cs:KScans[3],26h
            mov         cs:KScans[4],27h
            mov         cs:SaveGroup,0
            jmp         ActKeys
ActKey2?:
            pushf
            cli
            cmp         cs:Act?,0
            je          NoOldIG2
            call        OldIG
NoOldIG2:
            mov         cs:Act?,0
            popf
            call        sound
            call        sound
            mov         cs:NKScans,8
            mov         cs:NRight,4
            mov         cs:LiftMask,0fh
            mov         cs:ModeMask,3f0h
            mov         cs:KScans[0],1eh
            mov         cs:KScans[1],1fh
            mov         cs:KScans[2],20h
            mov         cs:KScans[3],21h
            mov         cs:KScans[4],24h
            mov         cs:KScans[5],25h
            mov         cs:KScans[6],26h
            mov         cs:KScans[7],27h ActKeys:
            mov         cs:Shifted?,0
            mov         cs:ScreenImage[770],0
            mov         cs:Capled?,0
            call        UpperLower
            mov         cs:ScreenImage[768],0
            mov         cs:Ctrled?,0
```

```
                mov     cs:ScreenImage[772],0
                mov     cs:Alted?,0
                mov     cs:ScreenImage[774],0
                mov     cs:Functed?,0
                mov     cs:ScreenImage[792],0 mov     cs:E0Prefix,0 mov     cs:ActiveGroup,0
                mov     cs:ActiveItem,0
                mov     cs:ActiveCol,0ffffh
                mov     cs:ActiveRow,0ffffh
                push    cx
                mov     ax,0
                mov     cl,ZZ
                call    AttrRow
                pop     cx mov     cs:KPressed,0       ;Reset the Key Comb
                mov     cs:WPressed,0
                call    ClearTimes ;Clear the top line of the chart
                push    cx
                push    bx
                mov     cx,20
                mov     bx,0
ClearBits:
                mov     cs:ScreenImage[bx],' '
                inc     bx
                inc     bx
                loop    ClearBits
                pop     bx
                pop     cx
                call    ShowBits mov     cs:Act?,1 call    I9end
                pop     ax
                iret
I9              endp I9end           proc
                in      al,61h      ;resets the keyboard
                mov     ah,al
                or      al,80h
                out     61h,al
                mov     al,ah
                out     61h,al cli
                mov     al,20h      ;reset interupts
```

```
                    out     20h,al
;                   sti     not needed because we always pop ax and iret
                    ret
I9end       endp EndAct      proc                    ;ends activation
                    mov     cs:Act?,0
                    call    sound
                    call    sound
                    call    sound
                    call    sound
                    call    sound
                    call    sound ret
EndAct      endp I1C         proc                    ;timer interupt cmp     cs:Act?,0
                    jne     IsAct2
                    jmp     NotAct
IsAct2:
                    push    es
                    push    ds
                    push    di
                    push    si
                    push    cx
                    push    ax
                    pushf
                    cli mov     cx,cs:NKScans
                    mov     si,0
LoopTimes:
                    push    cx
                    dec     cx
                    mov     di,cx
                    cmp     cs:KTimes[si],0
                    je      DoLoopTimes
                    dec     cs:KTimes[si]
                    cmp     cs:KTimes[si],0
                    jne     DoLoopTimes
;This key has timed out, so update WPressed
                    mov     ax,1
                    mov     cx,di
                    shl     ax,cl               ;ax has bit in place for this key
                    not     ax                  ;Now ax has this bit off, else on
                    and     cs:WPressed,ax      ;Update WPressed
                    call    UpGroupItem
DoLoopTimes:
                    pop     cx
                    inc     si
```

```
                loop    LoopTimes
                popf

;Flip the active intersection for flicker
                pushf
                cli
                mov     ax,cs:ActiveCol
                cmp     ax,0ffffh
                je      NoFlicker
                mov     di,cs:ActiveRow
                cmp     di,0ffffh
                je      NoFlicker
                add     di,ax
                mov     al,cs:FlickCount
                cmp     al,0
                jne     NoResetCount
                mov     al,2
NoResetCount:
                dec     al
                mov     cs:FlickCount,al
                cmp     al,0
                jne     NoFlicker
                mov     ah,Z
                xor     ah,ZZ
                xor     cs:ScreenImage[di],ah
NoFlicker:
                popf ;Following line is for mono, use 0b800h for color
                mov     ax,0B000h       ;es has segment for video buffer
                mov     es,ax
                mov     di,0 mov     ax,cs           ;ds has segment for screen image
                mov     ds,ax
                mov     si,offset cs:ScreenImage
                                ;si has the offset for screen image mov     cx,25

AnotherLine:

add     di,120   ;adjust the offset for video buffer push    cx
                mov     cx,20    ;count for one line of 25 lines
                rep movsw        ;copy the line
                pop     cx loop    AnotherLine pop     ax
                pop     cx
```

```
                    pop     si
                    pop     di
                    pop     ds
                    pop     es
NotAct:

pushf
                    call    cs:Vec1C            ;call timer interupt iret
I1C                 endp PutChar             proc
;put stuff in
; On entry, al has Ascii code, and ah has Scan code
                    push    di
                    push    ds
                    push    es
                    push    bx
                    pushf
                    cli push    ax                  ;Temp store key codes
                    mov     ax,40h
                    mov     es,ax
                    mov     bx,es:1Ch           ;adjust for circular buffer
                    push    bx
                    inc     bx
                    inc     bx
                    cmp     bx,3Eh      ;??? This adj is not general
                    jne     T2
                    mov     bx,1Eh
T2:
                    cmp     bx,es:1Ah
                    jne     ThereIsSpace
                    pop     bx
                    pop     ax
                    popf
                    call    sound
                    jmp     PutCharOut ThereIsSpace:
                    mov     es:1Ch,bx           ;adjust end of BIOS buffer
                    pop     bx
                    pop     ax                  ;Recover key codes
                    mov     es:[bx],ax          ;put ASCII and Scan code in popf
PutCharOut:
                    pop bx
                    pop es
                    pop ds
```

```
                    pop     di
                    ret
PutChar             endp Sound               proc                    ;destroys AX push    es mov     ax,40h
                    mov     es,ax
                    mov     ax,es:6Ch
S1:                 cmp     es:6Ch,ax
                    je      S1              ;wait till clock tick changes
                    inc     ax
                    mov     cs:tick,ax mov     al,0B6h
                    out     43h,al          ;get timer ready mov     ax,0C00h out     42h,al
                    mov     al,ah
                    out     42h,al          ;set freq in      al,61h
                    or      al,3
                    out     61h,al          ;turn speaker on mov     ax,cs:tick
S2:                 cmp     ax,es:6Ch
                    je      S2              ;do for one clock tick in      al,61h          ;turn off speaker
                    and     al,11111100b
                    out     61h,al pop     es
                    ret
Sound               endp UpperLower          proc push    cx
                    push    di
                    push    ax mov     cl,0
                    cmp     cs:Shifted?,0
                    je      NotShifted2
                    not     cl
NotShifted2:
                    cmp     cs:Capled?,0
```

```
                je      NotCapled2
                not     cl
NotCapled2:
                cmp     cl,0
                jne     IsUpper2
;Lower any uppers that are found
                mov     di,40
NextSpot:
                mov     al,cs:ScreenImage[di]
                cmp     al,41h
                jb      NotAnUpper
                cmp     al,5ah
                ja      NotAnUpper
                add     al,20h
                mov     cs:ScreenImage[di],al
NotAnUpper:
                inc     di
                inc     di
                cmp     di,160
                jb      NextSpot
                jmp     AfterUpper
;Upper any lowers that are found
IsUpper2:
                mov     di,40
NextSpot2:
                mov     al,cs:ScreenImage[di]
                cmp     al,61h
                jb      NotALower
                cmp     al,7ah
                ja      NotALower
                sub     al,20h
                mov     cs:ScreenImage[di],al
NotALower:
                inc     di
                inc     di
                cmp     di,160
                jb      NextSpot2

AfterUpper:

pop     ax
                pop     di
                pop     cx
                ret
UpperLower      endp ShowBits        proc
                push    ax
                push    cx
                push    bx
                push    di ;Do the display on the top line
```

```
                cmp     cs:NRight,4
                je      ShowBits2
                mov     cx,5
                mov     ax,cs:KPressed
                mov     di,26
                mov     bl,2
                jmp     ShowBitsX
ShowBits2:
                mov     cx,8
                mov     ax,cs:KPressed
                mov     di,30
                mov     bl,5
ShowBitsX:
BitLoop:
                mov     ah,al
                and     al,1
                inc     al
                mov     cs:ScreenImage[di],al
                mov     al,ah
                dec     di
                dec     di
                cmp     cl,bl
                jne     clblne
                sub     di,4
clblne:
                shr     al,1
                loop    BitLoop pop     di
                pop     bx
                pop     cx
                pop     ax
                ret
ShowBits        endp UpGroupItem     proc
                push    ax
                push    cx
                pushf
                cli
                mov     ax,cs:WPressed ;Update current group and item for one-handed version
                cmp     cs:NRight,4
                je      Not1Handed2
                mov     cx,ax
                and     cx,0F0h
                je      NotGroup1Handed2
                shl     al,1
                shl     al,1
                shl     al,1
                shl     al,1
```

```
                jmp     ANGH2
NotGroup1Handed2:
                or      al,cs:SaveGroup
ANGH2:
                jmp     axReady
Not1Handed2:
;Update current group and item for two-handed version
axReady:
                mov     cl,al
                and     cx,0fh      ;mask to get the item only
                shr     al,1
                shr     al,1
                shr     al,1
                shr     al,1
                and     ax,0fh      ;mask to get the group only
                call    NewItemGroup
After2Handed2:

popf
                pop     cx
                pop     ax
                ret
UpGroupItem     endp OldIG           proc push    cx
                push    ax mov     al,cs:ActiveGroup
                mov     ah,0
                mov     cl,Z
                call    AttrRow mov     al,cs:ActiveItem
                mov     ah,0
                mov     cl,Z
                call    AttrCol pop     ax
                pop     cx
                ret
OldIG           endp NewItemGroup proc cmp     cl,cs:ActiveItem
                jne     IsAChange
                cmp     al,cs:ActiveGroup
                jne     IsAChange
                jmp     NoChange IsAChange:
```

```
            push    ax
            push    cx
            push    ax call    OldIG mov     cl,ZZ
            mov     ah,0
            call    AttrRow
            pop     ax
            mov     cs:ActiveGroup,al pop     ax          ;This is value of cx, put into ax
            push    ax mov     cl,ZZ
            mov     ah,0
            call    AttrCol
            pop     cx
            mov     cs:ActiveItem,cl
            pop     ax mov     cs:FlickCount,0

NoChange:
            ret
NewItemGroup endp

AttrCol     proc
            push    di mov     di,ax
            mov     al,cs:ItemCol[di]
            mov     cs:ActiveCol,0ffffh
            cmp     al,0ffh
            je      IllegalCol dec     al
            mov     ah,0
            shl     ax,1
            inc     ax
            mov     cs:ActiveCol,ax mov     di,ax
            add     di,40
            mov     cs:ScreenImage[di],cl
            add     di,40
            mov     cs:ScreenImage[di],cl
            add     di,40
            mov     cs:ScreenImage[di],cl
            add     di,40
            mov     cs:ScreenImage[di],cl
            add     di,80
```

```
              mov     cs:ScreenImage[di],cl
              add     di,40
              mov     cs:ScreenImage[di],cl
              add     di,40
              mov     cs:ScreenImage[di],cl
              add     di,80
              mov     cs:ScreenImage[di],cl
              add     di,40
              mov     cs:ScreenImage[di],cl
              add     di,80
              mov     cs:ScreenImage[di],cl
              add     di,80
              mov     cs:ScreenImage[di],cl IllegalCol:
              pop     di
              ret
AttrCol       endp AttrRow       proc
              push    di mov     di,ax
              mov     al,cs:GroupLine[di]
              mov     cs:ActiveRow,0ffffh
              cmp     al,0ffh
              je      IllegalGroup dec     al
              mul     cs:LineLength2
              mov     cs:ActiveRow,ax mov     di,ax
              add     di,9
              mov     cs:ScreenImage[di],cl
              add     di,2
              mov     cs:ScreenImage[di],cl
              add     di,2
              mov     cs:ScreenImage[di],cl
              add     di,2
              mov     cs:ScreenImage[di],cl
              add     di,4
              mov     cs:ScreenImage[di],cl
              add     di,2
              mov     cs:ScreenImage[di],cl
              add     di,2
              mov     cs:ScreenImage[di],cl
              add     di,4
              mov     cs:ScreenImage[di],cl
              add     di,2
              mov     cs:ScreenImage[di],cl
              add     di,4
              mov     cs:ScreenImage[di],cl
```

```
IllegalGroup:
            pop         di
            ret
AttrRow     endp

ClearTimes  proc
            push        ax
            push        es
            push        cx
            push        di
            cld
            mov         al,0
            mov         cx,cs:NKScans
            mov         di,offset cs:KTimes
            push        cs
            pop         es
            repne stosb
            pop         di
            pop         cx
            pop         es
            pop         ax
            ret
ClearTimes  endp Buffer      db          0           ;Used just to mark end of resident code
;
Msg     db  10,'Minimal Motion (TM) keyboard software',13,10
        db  'Copyright (c) 1993 Equal Access Computer Technology, Inc.'
        db                                                      13,10,'$'

Already     db  10,'MM is already loaded',13,10,'$'

Init        proc push        cs
            pop         ds

;check for command line
            mov         bx,80h
            mov         cl,[bx]
            cmp         cl,0
            je          P4 mov         si,81h

Parse:      mov         al,[si]
            inc         si
            cmp         al,0Dh
            je          P4
            cmp         al,'/'
            je          Parse
            cmp         al,' '
```

```
                je      Parse or      al,20h          ;convert to lower case P36:            cmp     al,'u'          ;uninstall?
                jne     Parse
                jmp     UnInstall P4:             call    Loaded?
                jne     P42

;already loaded into memory
                mov     ah,9
                mov     dx,offset Already
                int     21h             ;print 'already loaded'

Outtahere:      mov     ah,4Ch
                int     21h     ;end

P42:

P5:             mov     ah,9
                mov     dx,offset Msg
                int     21h             ;print copyright message mov     ax,cs:2Ch
                mov     es,ax
                mov     ah,49h
                int     21h             ;free environment memory mov     ax,3509h
                int     21h             ;get int 09 vector
                mov     word ptr Vec9,BX
                mov     word ptr Vec9[2],ES mov     ax,351Ch
                int     21h             ;get int vec 1C
                mov     word ptr Vec1C,bx
                mov     word ptr Vec1C[2],es mov     word ptr cs:[0100],0
                mov     bx,offset Buffer
                mov     cl,4
                shr     bx,cl           ;paragraphs needed
                add     bx,01h          ;My conservative rounding up
                sub     bx,0Ah          ;less 160 bytes code shifted push    bx
                mov     si,100h
                mov     cx,offset Buffer
                sub     cx,si
                mov     di,60h
                push    ds
```

```
            pop     es
            cld
            rep     movsb               ;mov code down 160 bytes mov     ax,ds
            sub     ax,0Ah
            mov     ds,ax
            mov     ax,2509h
            mov     dx,offset I9        ;set Int9 vector
            int     21h mov     ax,251Ch
            mov     dx,offset I1C       ;set Int1C vector
            int     21h pop     dx
            inc     dx
            MOV     Ax,3100h
            INT     21h                 ;terminate and stay resident
Init        endp ExitMsg     db      13,10,'MM not loaded',13,10,'$'
Removed     db      13,10,'MM is uninstalled',13,10,'$'

;check if already loaded

Loaded?     proc
;checks to see if TSR already is loaded.  If it is then zf set upon
;return and es:di points to offset info in TSR mov     bx,offset Message
            inc     Message             ;avoid disk cache match
            mov     ax,cs
            mov     dx,0A000h-1
NextPara:   inc     dx                  ;next paragraph
            mov     es,dx
            cmp     dx,ax
            je      NotHere             ;If our seg then search is done
            mov     si,bx               ;else check for match
            mov     di,bx
            mov     cx,0Ah
            rep     cmpsb               ;a match?
            jnz     NextPara            ;if no match, keep looking
            ret NotHere:    inc     ax
            cmp     ax,dx               ;return with not equal
            ret Loaded?     endp UnInstall   proc
```

```
                call    Loaded?
                jne     U2

;reset interupts to original values
                mov     dx,word ptr es:Vec9
                mov     ax,word ptr es:Vec9[2]
                mov     ds,ax
                mov     ax,2509h
                int     21h                     ;reset int 9
                mov     dx,word ptr es:Vec1C
                mov     ax,word ptr es:Vec1C[2]
                mov     ds,ax
                mov     ax,251Ch                ;reset int 1C
                int     21h
                mov     ax,es
                add     ax,0Ah
                mov     es,ax
                mov     ah,49h
                int     21h                     ;free memory block
                push    cs
                pop     ds
                mov     dx,offset Removed
                mov     ah,9
                int     21h                     ;print message
U2:             mov     ah,4Ch
                int     21h                     ;end UnInstall       endp Code            ends
                end     LGo
```

I claim:

1. A method for the input of characters to a computer or other device with a chord keyboard having 4 keys operated by four fingers, one key per finger, comprising the steps of:
   presenting the set of characters that may be entered as an arrangement of groups and of characters within the groups wherein each of said groups comprises a set of ten of the characters;
   arranging said set of ten characters in the form of four subgroups wherein a first subgroup has four characters, a second subgroup has three characters, a third subgroup has two characters and a fourth subgroup has one character;
   choosing an active group from among the presented groups with a first stroke of a chord; and
   choosing a character from said four subgroups having said set of ten characters of said active group with a second stroke of a chord, said step of choosing a character comprises one of the following steps:
      choosing one of the four characters from said first subgroup with a chord of just one of said four fingers;
      choosing one of the three characters from said second subgroup with a chord of two adjacent fingers of said four fingers;
      choosing one of the two characters from said third subgroup with a chord of three adjacent fingers of said four fingers;
      choosing the character of said fourth subgroup with a chord of all of said four fingers;
   inputting a character corresponding to said second stroke of a chord to said computer or other device.

2. The method of claim 1, further comprising the steps of:
   inputting said character corresponding to said second stroke of a chord to said computer or other device when all of the keys of the chord are released within a predetermined period of time; and
   producing a visual or audible display of the effect on said computer or other device that would occur if all of the keys of the chord were released within a predetermined period of time when pressing a chord of one or more keys.

3. The method of claim 2, further comprising the steps of:
   changing the keys pressed while maintaining at least one pressed key; and
   producing a change in the visual or audible display of the effect on said computer or other device corresponding to said changing that would occur if all of the keys of the chord were released within a predetermined period of time.

4. A keyboard system for the input of characters to a computer or other device, comprising:
   a chord keyboard having four keys operated by four fingers, one key per finger;
   means for presenting the set of characters that may be entered as an arrangement of groups and of characters within the groups wherein each of said groups comprises a set of ten of the characters;
   means for arranging said set of ten characters in the form of four subgroups wherein a first subgroup has four characters, a second subgroup has three characters, a third subgroup has two characters and a fourth subgroup has one character;
   means for choosing an active group from among the presented groups with a first stroke of a chord; and
   means for choosing a character from said four subgroups having said set of ten characters of said active group with a second stroke of a chord, said means for choosing a character comprises:
      means for choosing one of the four characters from said first subgroup with a chord of just one of said four keys;
      means for choosing one of the three characters from said second subgroup with a chord of two contiguous keys of said four keys;
      means for choosing one of the two characters from said third subgroup with a chord of three contiguous keys of said four keys;
      means for choosing the character of said fourth subgroup with a chord of all of said four keys; and
   means for inputting a character corresponding to said second stroke of a chord to said computer or other device.

5. The keyboard system of claim 4, further comprising:
   means for inputting said character corresponding to said second stroke of a chord to said computer or other device when all of the keys of the chord are released within a predetermined period of time; and
   means for producing a visual or audible display of the effect on said computer or other device that would occur if all of the keys of the chord were released within a predetermined period of time when pressing a chord of one or more keys.

6. The keyboard system of claim 5, further comprising:
   means for producing a change in said visual or audible display corresponding to any change in the keys pressed while maintaining at least one pressed key.

7. A method for the input of characters to a computer or other device with a chord keyboard having 4 keys operated by four fingers, one key per finger, and also having at least one additional key, comprising the steps of:
   presenting the set of characters that may be entered as an arrangement of groups and of characters within the groups wherein each of said groups comprises a set of ten of the characters;
   arranging said set of ten characters in the form of four subgroups wherein a first subgroup has four characters, a second subgroup has three characters, a third subgroup has two characters and a fourth subgroup has one character;
   choosing an active group from among the presented groups with a stroke of a chord using said at least one additional key; and
   choosing a character from said four subgroups having said set of ten characters of said active group with a subsequent stroke of a chord using at least one of said four keys, said step of choosing a character comprises one of the following steps:
      choosing one of the four characters from said first subgroup with a chord of just one of said four fingers;
      choosing one of the three characters from said second subgroup with a chord of two adjacent fingers of said four fingers;
      choosing one of the two characters from said third subgroup with a chord of three adjacent fingers of said four fingers;
      choosing the character of said fourth subgroup with a chord of all of said four fingers;
   inputting a character corresponding to said subsequent stroke of a chord to said computer or other device.

8. The method of claim 7, further comprising the steps of:

inputting said character corresponding to said subsequent stroke of a chord to said computer or other device when all of the keys of the chord are released within a predetermined period of time; and producing a visual or audible display of the effect on said computer or other device that would occur if all of the keys of the chord were released within a predetermined period of time when pressing a chord of one or more keys.

9. The method of claim 8, further comprising the steps of:

changing the keys pressed while maintaining at least one pressed key; and producing a change in the visual or audible display of the effect on said computer or other device corresponding to said changing that would occur if all of the keys of the chord were released within a predetermined period of time.

10. A keyboard system for the input of characters to a computer or other device, comprising:

a chord keyboard having four keys operated by four fingers, one key per finger, and also having at least one additional key;

means for presenting the set of characters that may be entered as an arrangement of groups and of characters within the groups wherein each of said groups comprises a set of ten of the characters;

means for arranging said set of ten characters in the form of four subgroups wherein a first subgroup has four characters, a second subgroup has three characters, a third subgroup has two characters and a fourth subgroup has one character;

means for choosing an active group from among the presented groups with a stroke of a chord; and means for choosing a character from said four subgroups having said set of ten characters of said active group with a subsequent stroke of a chord, said means for choosing a character comprises:

means for choosing one of the four characters from said first subgroup with a chord of just one of said four keys;

means for choosing one of the three characters from said second subgroup with a chord of two contiguous keys of said four keys;

means for choosing one of the two characters from said third subgroup with a chord of three contiguous keys of said four keys;

means for choosing the character of said fourth subgroup with a chord of all of said four keys; and means for inputting a character corresponding to said subsequent stroke of a chord to said computer or other device.

11. The keyboard system of claim 10, further comprising:

means for inputting said character corresponding to said subsequent stroke of a chord to said computer or other device when all of the keys of the chord are released within a predetermined period of time; and means for producing a visual or audible display of the effect on said computer or other device that would occur if all of the keys of the chord were released within a predetermined period of time when pressing a chord of one or more keys.

12. The keyboard system of claim 11, further comprising:

means for producing a change in said visual or audible display corresponding to any change in the keys pressed while maintaining at least one pressed key.

* * * * *